United States Patent [19]
Williamson

[11] Patent Number: 5,872,443
[45] Date of Patent: Feb. 16, 1999

[54] ELECTRONIC METHOD FOR CONTROLLING CHARGED PARTICLES TO OBTAIN OPTIMUM ELECTROKINETIC BEHAVIOR

[76] Inventor: Floyd L. Williamson, 1906 Shellbrook Dr., Huntsville, Ala. 35806

[21] Appl. No.: 802,032

[22] Filed: Feb. 18, 1997

[51] Int. Cl.$^6$ .......................... H01M 10/44; H01M 10/46
[52] U.S. Cl. ................................................. 320/21
[58] Field of Search ..................... 320/5, 21, 22, 320/30, 31, 35, 39, 43, 48, 49

[56] References Cited

U.S. PATENT DOCUMENTS

| | | | |
|---|---|---|---|
| 3,597,673 | 8/1971 | Burkett et al. | 320/5 |
| 3,614,583 | 10/1971 | Burkett et al. | 320/5 |
| 3,617,851 | 11/1971 | Du Puy et al. | 320/22 |
| 4,289,836 | 9/1981 | Lemelson | 429/61 |
| 4,296,461 | 10/1981 | Mallory et al. | 363/22 |
| 4,385,269 | 5/1983 | Aspinwall et al. | 320/14 |
| 4,451,743 | 5/1984 | Suzuki et al. | 307/110 |
| 4,728,877 | 3/1988 | Adamson | 320/21 |
| 4,740,739 | 4/1988 | Quammen et al. | 320/14 |
| 4,746,852 | 5/1988 | Martin | 320/21 |
| 4,829,225 | 5/1989 | Podrazhansky et al. | 320/14 |
| 5,039,381 | 8/1991 | Mullarkey | 204/47.5 |
| 5,063,341 | 11/1991 | Gali | 320/20 |
| 5,171,416 | 12/1992 | Lenhart et al. | 205/57 |
| 5,191,274 | 3/1993 | Lloyd et al. | 320/2 |
| 5,218,284 | 6/1993 | Burns et al. | 320/14 |
| 5,307,000 | 4/1994 | Podrazhansky et al. | 320/14 |
| 5,398,756 | 3/1995 | Brodsky et al. | 166/248 |

(List continued on next page.)

OTHER PUBLICATIONS

Lawrence Berkeley Laboratory, "LBL Researchers study Ketene Chemical transition", Lynn Yarris, 1992.

Lawrence Berkeley Laboratory, "LBL Researchers Work on New Generation of Batteries", Jeffrey Kahn, 1990.

Lawrence Berkeley Laboratory, "Accerlerating the Market for Efficient Lighting", unk.

Luminescent Systems Inc., "The Design Guide" Electroluminescence Lighting, unk.

NEC Corporation, "Electroluminescent Light TA Type", 1994.

"Thin film electroluminescence", G. O. Müller, unk.

"Liquid Crystal Displays and Electroluminescent Thin Films", Dr. Pauwels and Dr. Visschere, unk.

General Electric, "Nickel–Cadmium Battery Application Engineering Handbook", $2^{nd}$ ed., 1975.

"Electrochemical Systems", $2^{nd}$ ed., John Newman, 1991.

"Electrochemical Engineering Principles", Geoffrey Prentice, 1991.

(List continued on next page.)

Primary Examiner—Edward Tso

[57] ABSTRACT

An electronic method is described whereby the applied electromotive force optimizes the electrokinetic behavior of charged particles to match closely the natural electrical response and physical structure of the system. The method shapes the electromotive force's amplitude and frequency to normalize the relative interactions between the charged particles and the physical structure. An injection means (1) allows this method to be applied to a broad base of physical, biological, and electrochemical processes that depend on the electrokinetic behavior of charged particles. The method can effectively utilize the reactive energy or amplification occurring at natural system resonance to enhance the performance of the system without an increase in the applied power. In an electrochemical process the method provides an optimized mass transport perturbation, including the electrical double layer, that is perpendicular to the electrodes. Further, a battery module (52) is disclosed using this method to control and improve performance in electrolytic, galvanic, and storage modes of operation. Advantages of this method include less energy consumption, better material utilization, tighter process control, simpler circuitry, lower cost, longer operational life, and higher process throughput.

26 Claims, 24 Drawing Sheets

System Block Diagram

U.S. PATENT DOCUMENTS

| | | | |
|---|---|---|---|
| 5,457,377 | 10/1995 | Jonsson | 320/5 |
| 5,458,747 | 10/1995 | Marks et al. | 204/130 |
| 5,471,128 | 11/1995 | Patino et al. | 320/13 |
| 5,486,280 | 1/1996 | Bullock et al. | 205/67 |
| 5,498,951 | 3/1996 | Okamura et al. | 322/96 |
| 5,538,805 | 7/1996 | Aragon | 429/7 |
| 5,550,104 | 8/1996 | Bhattacharya | 505/472 |
| 5,563,002 | 10/1996 | Harshe | 429/7 |
| 5,563,496 | 10/1996 | McClure | 320/48 |
| 5,565,759 | 10/1996 | Dunstan | 320/48 |
| 5,569,550 | 10/1996 | Garrett et al. | 429/7 |
| 5,572,110 | 11/1996 | Dunstan et al. | 320/30 |
| 5,573,869 | 11/1996 | Hwang et al. | 429/91 |
| 5,574,358 | 11/1996 | Garrett | 323/276 |

OTHER PUBLICATIONS

"Physical Chemistry of Surfaces", $5^{th}$ ed., Arthur Adamson, 1990.

"Solid State Electronic Devices", $4^{th}$ ed., Ben Streetman, 1995.

"Physical Chemistry", Robert Alberty and Robert Silbey, 1992.

"The Science and Engineering of Materials", $3^{rd}$ ed., Donald Askeland, 1994.

"An Introduction to electrochemical power sources", Colin Vincent, et al, 1984.

High Frequency Power Conference, "Rechargeable Alkaline Battery System", Floyd Williamson, 1994.

AVEX Electronics, "Renewal Charger Engineering Documentation", Floyd Williamson, 1993, unpublished.

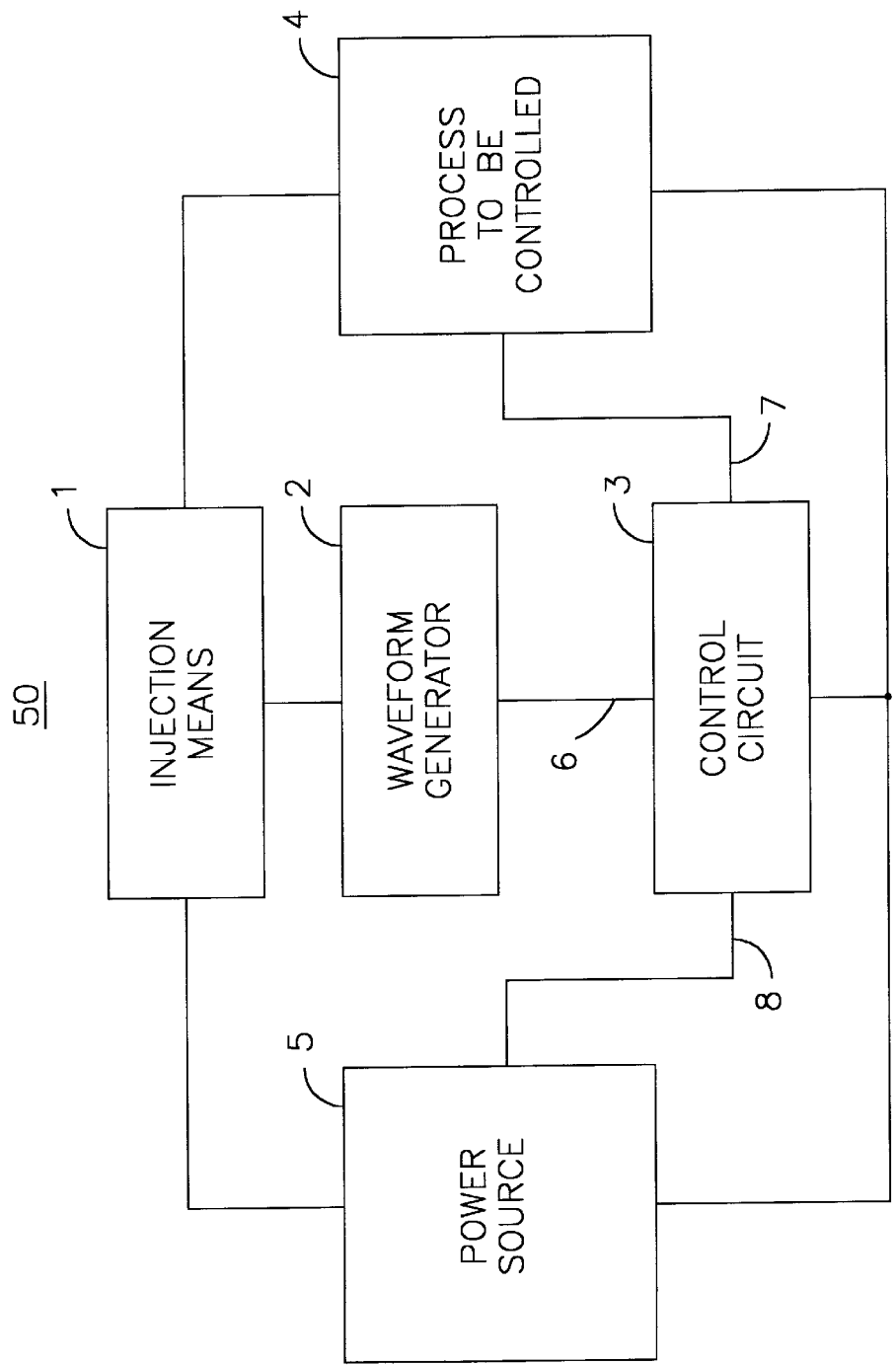
FIG. 6  System Block Diagram

Simplified System Schematic Diagram

Simplified Integral Battery Schematic Diagram

FIG. 9 Simplified Integral Battery Schematic Diagram – Alternate

Simplified System Schematic Diagram — Alternate

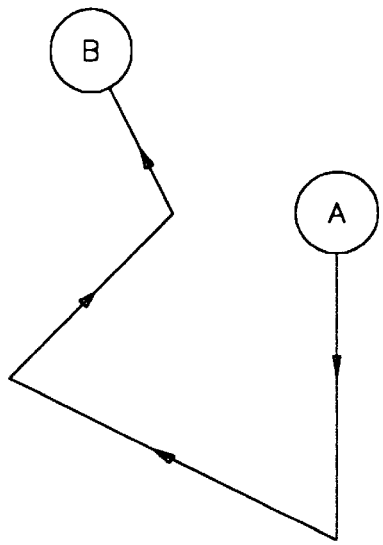
Random movement of particle with no electric field applied
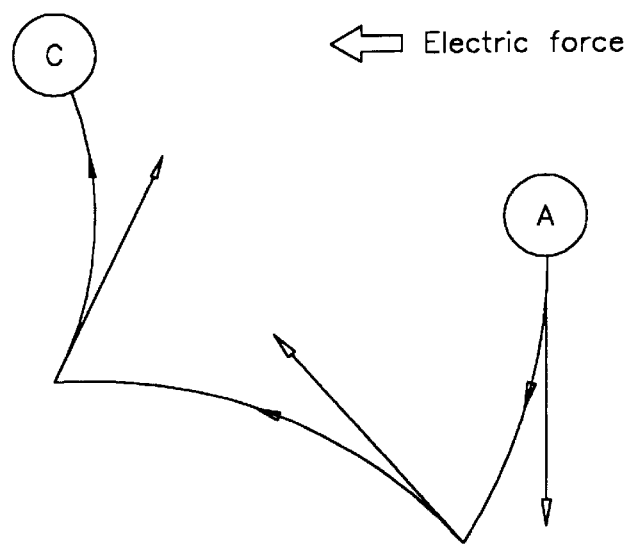
Random movement of particle under influence of a DC electric field.
FIG. 12

···· Concentration 0.001
-- Concentration 0.005
— Concentration 0.01

— Concentration 0.01
-- Concentration 0.005
···· Concentration 0.001

FIG. 15 - PRIOR ART

High current emf-timing diagram - alternate

Flourescence

Phosphorescence

Dielectric polarization with electric field applied

Dielectric loss results from reversing dielectric polarization

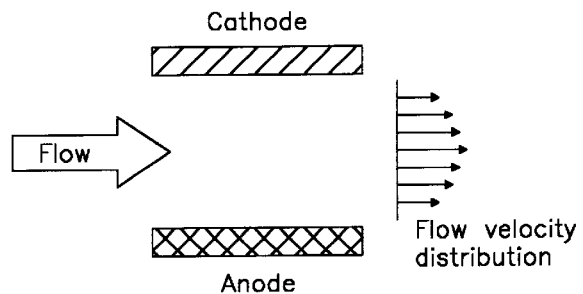
Plane parallel electrodes with flow channel —
No mass-transport perturbation from DC polarization
FIG. 22A  —  PRIOR ART
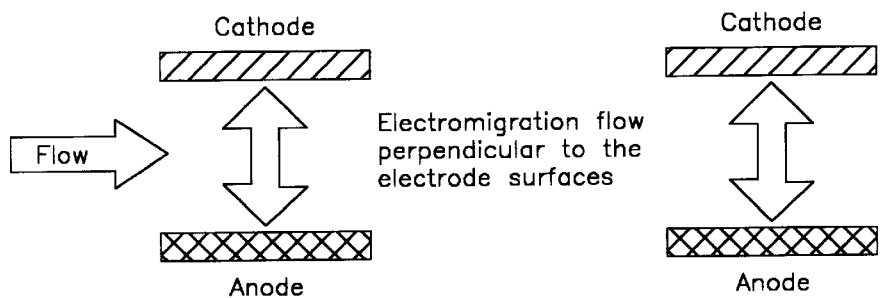
Improved plane parallel electrodes with or without flow channel —
with electromigration mass-transport perturbation
FIG. 22B

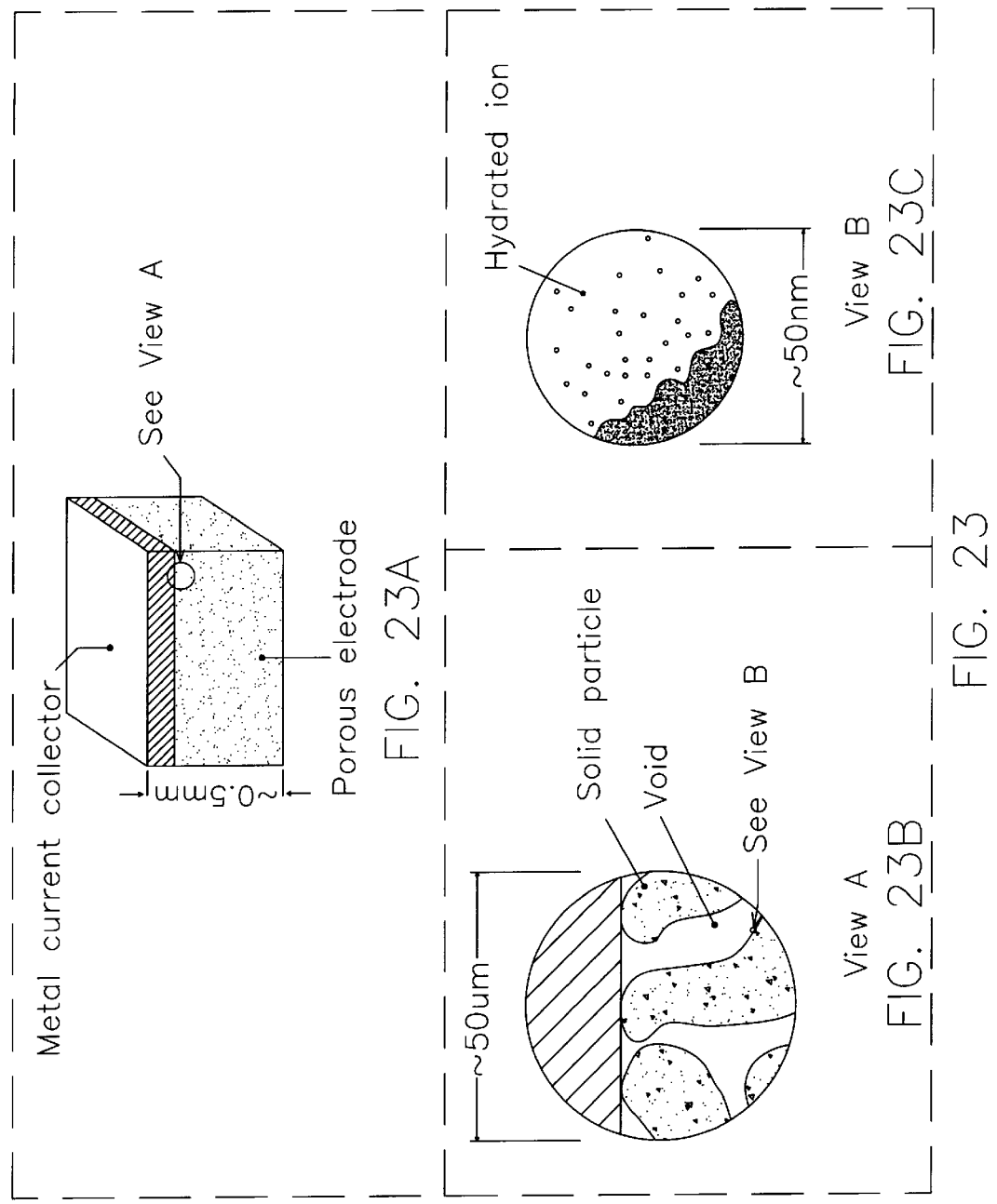

Equivalent Circuit Diagrams — Electrochemical cell

ELECTRONIC METHOD FOR CONTROLLING CHARGED PARTICLES TO OBTAIN OPTIMUM ELECTROKINETIC BEHAVIOR

FIELD OF INVENTION

This invention relates to physical, biological, and electrochemical processes that depend on the electrokinetic behavior of charged particles, and in particular, an improved method for controlling the electrokinetic behavior in such processes.

BRIEF DESCRIPTION OF THE DRAWINGS

FIG. 6 is a system block diagram illustrating the essential elements of the invention.

FIG. 12 is a perspective drawing of charged particle Brownian movement with and without a DC field applied.

FIGS. 22A and 22B are perspective drawings illustrating the mass-transport flow in a plane-parallel electrode system used to compare prior art with the advantages of this invention.

FIG. 23 is a perspective illustration of a porous electrode to illustrate the disadvantages of using DC electromotive forces and the advantages of this invention.

BACKGROUND OF THE INVENTION

Figure 1:
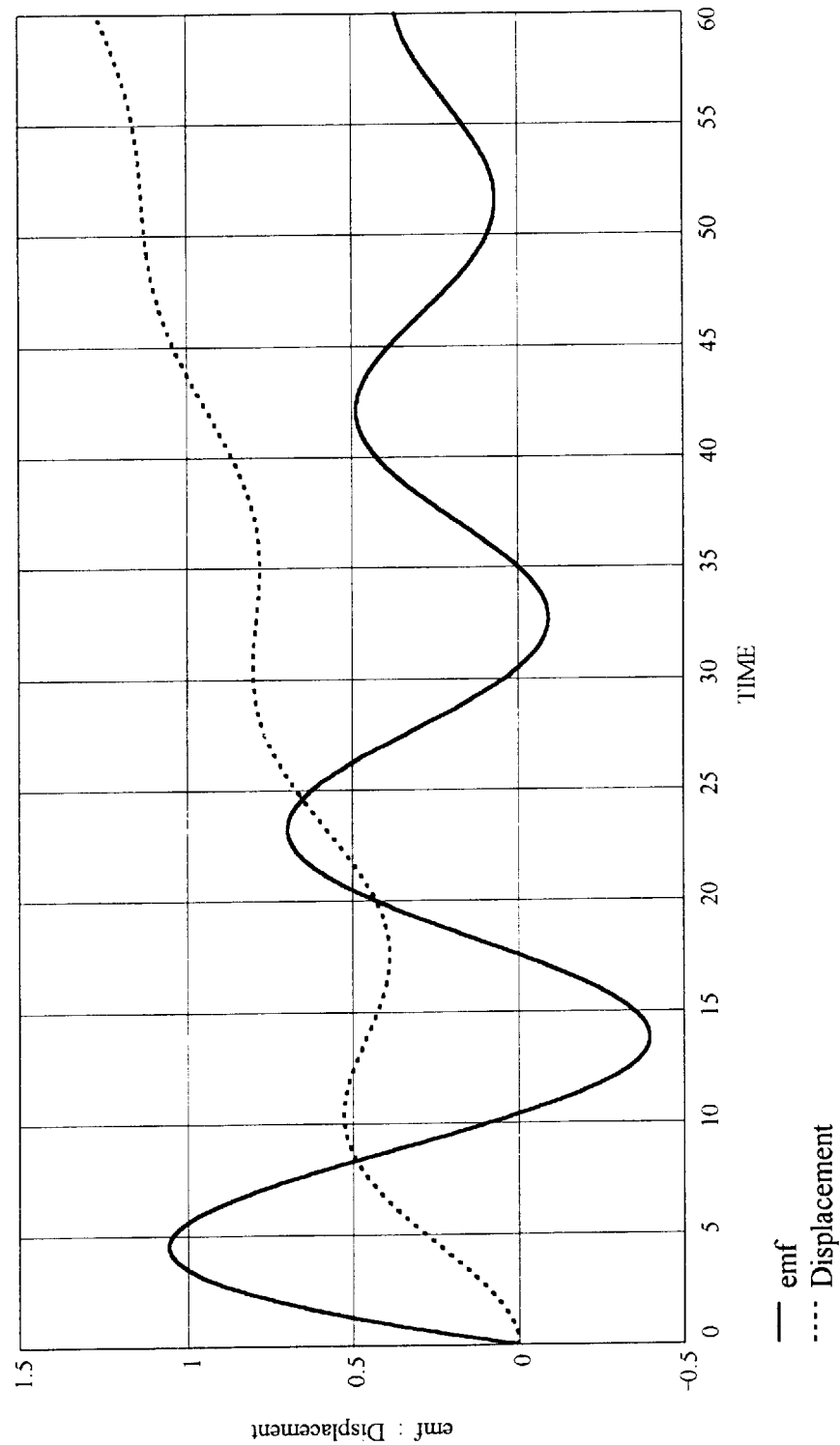
FIG. 1 is a perspective plot of the applied emf or electromotive force and the resulting charged particle displacement versus time, illustrating one preferred-embodiment of the invention.

It is estimated that the production of aluminum and chlorine consumes 6 percent of the U.S. electrical output. Faraday's Law of Electrolysis explains how the amount of chemical change produced by the passage of an electric current is proportional to the total quantity of the electric charge. Still Faraday's equation gives only a theoretical value for the change in mass. This discrepancy is primarily caused because some charge is consumed in parasitic processes. The world's dependence on battery-powered equipment increases every day. Yet the amount of useful energy that we may extract from batteries is often less than 35 percent of the theoretical available energy. The difference between the theoretical and useful energy is not lost but it is unavailable at the time. The cost of lighting in the US is roughly $40 billion per year. New energy-saving flourescent lights and higher efficiency ballasts are available to reduce the energy costs but with much higher acquisition cost. Light dimming can further reduce the energy consumption but the cost is prohibitively high except in small installations. Electroluminescent lighting strips offer better operational performance in many applications versus incandescent lighting, especially for emergency lighting. The conflict between increasing output brightness and extending operating life plagues electroluminescent lighting. The high acquisition cost of the complex ac power supplies needed for these photochemical processes diminishes the acceptance of the lights and the longer term environmental advantages are lost.

A key to electrochemical reaction rates is the ability to manipulate an additional electrical potential that results in much greater control of the reaction process. A one volt change at the surface of the electrode can result in an eight-order-of-magnitude increase in the reaction rate. This amount of change is equivalent to a temperature change of several hundred degrees in a chemical process. The Butler-Volmer equation expresses the electrode kinetics by relating the current-overpotential relationship to the exchange current density and the anode and cathode transfer coefficients. For large overpotential values, a simplification of the Butler-Volmer equation results in the Tafel equation:

$$i = i_o \exp\left(\frac{\alpha_a F}{RT} \eta_s\right)$$

The Tafel equation can be solved directly to find current density i and activation or surface overpotential $\eta_s$. The term $i_o$ is the exchange current, $\alpha_a$ being the anode transfer coefficient, F is Faraday's constant, R is the universal gas constant, and T is the temperature in degrees Kelvin. The potential developed across the cell is equal to:

$$V = \eta_s(\text{anode}) + \eta_c(\text{anode}) + IR - \eta_c(\text{cathode}) - \eta_s(\text{cathode})$$

The term $\eta_c$ is the concentration overpotential and the term IR represents the ohmic losses. The cathode overpotentials are negative by convention so that the five components are added to define the potential across the cell. The five elements are not energy sources and represent losses.

The reaction rate is dominated by the activation overpotential $\eta_s$ that results from the occurrence of an electrical double layer structure that is present at the solid-liquid (surface-solution) interface. This electrical double layer or double layer acts as a capacitor in parallel with the reaction process. The activation or surface overpotential acts to impede the electrical field that is driving the reaction rate. The activation overpotential is a parasitic energy loss and results in the production of heat. Historically, electrochemical systems have been powered with DC voltages and currents. Driving the reaction with DC, whether continuous or pulsed, also means that a significant portion of the energy is consumed by charging the double layer.

In 1879, Helmholtz first characterized the double layer as a parallel plate capacitor that was invariant. Around the turn of the century, Krüger defined the influence of the double layer on the system impedance and Tafel related the activation overpotential that developed to the overall reaction rate. Gouy and Chapman, around 1910, described the charge across the double layer as a function of electrical potential and concentration of reactants. About 1920, Debye and Hückel applied the theory to the planar geometry of the double layer. The Debye-Hückel theory further explains that each ion in the electrolytic solution is surrounded by an ion atmosphere that restricts ion mobility when a current is passed through the medium. Stern then combined the theories and described the double layer structure as two double layers, one immobile near the surface and the other a diffuse region extending into the solution. Frumkin added a correction to the Stern model to account for the changes in the double layer structure caused by localized variations in the concentration of the reactants and reaction products.

Stern described the capacitance of the two double layers as two capacitors connected in series. The inner or Helmholtz layer capacitance is designated as $C_h$ and the diffuse or Gouy-Chapman layer is designated as $C_{gc}$. The result of this arrangement is that the smaller capacitance dominates the effective capacitance $C_s$ (Stern capacitor) of the double layer structure per the equation:

$$\frac{1}{C_s} = \frac{1}{C_h} + \frac{1}{C_{gc}}$$

Figure 24B:
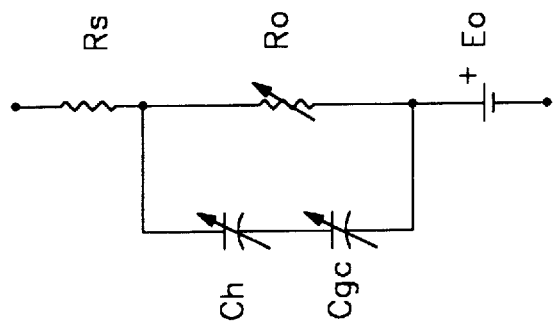
FIG. 24B is an enhanced equivalent circuit for an electrochemical cell depicting the dynamic electrokinetic behavior of the cell when operated as described in this invention.

FIG. 24B illustrates the electrical circuit configuration. When the Helmholtz region is highly concentrated, $C_{gc}$ is large compared with $C_h$ so the effective capacitance $C_s$ is approximately equal to $C_h$. With a dilute concentration, $C_s$ will be approximately equal to $C_{gc}$.

Figure 11:
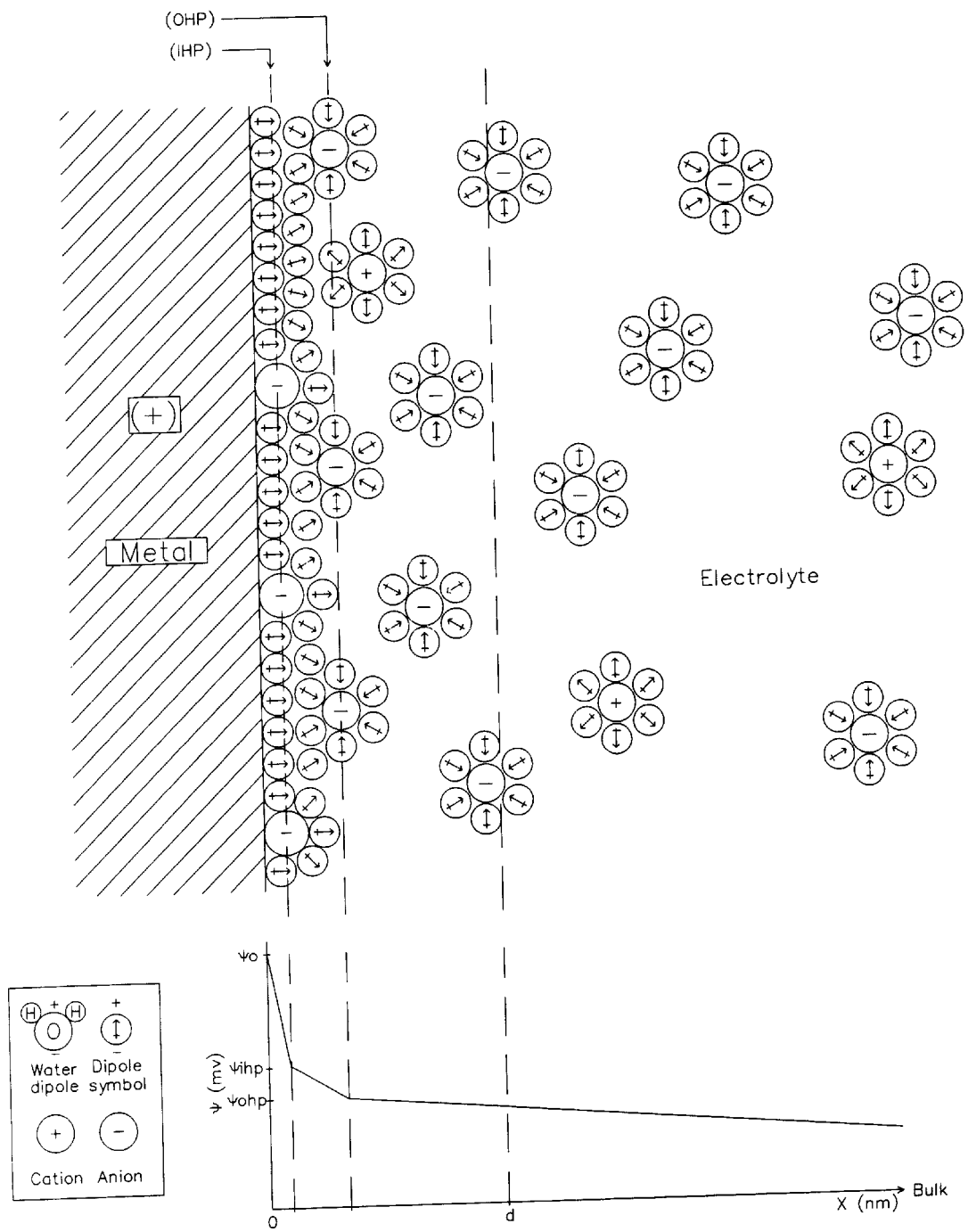
FIG. 11 is a perspective drawing illustrating the dynamic nature of the electrical double layer at the solid-solution junction and the resulting potential gradient.

FIG. 11 illustrates the theoretical physical arrangement of the double layer at an active solid-solution junction. Two lines are drawn on FIG. 11 and labeled by convention as IHP for inner Helmholtz plane and OHP for outer Helmholtz plane. The distance from the surface to the IHP is roughly one nanometer (nm) and the distance from the surface to the OHP is about 3 nm. The typical capacitance developed over this region can be between 10 $\mu$F/cm$^2$ and 50 $\mu$F/cm$^2$. If the potential across the IHP (1 nm) is 100 mV then the field strength across the region is very large at $1 \times 10^8$ V/m. The graph at the bottom of FIG. 11 shows the potential gradient that develops. The electrical potential at the surface is designated as $\psi_o$ and the potential falls off very rapidly to $\psi_{ihp}$ at IHP and then again falls rapidly to $\psi_{ohp}$ at OHP. The potential $\psi$ then gradually decreases as the gradient extends into the solution. The potential can be viewed as a kinetic resistance. The potential energy of an ion in the electric field is based on the formula $ze\psi$, with z equal to the valence of the ion and e equal to the charge on the electron. The plane at d coincides with the effective thickness of the diffuse layer and can be as small as 3 nm at low concentrations and at $\psi_o$ less than 25 mV. The potential $\psi_o$ can easily be hundreds of millivolts.

Figure 13:
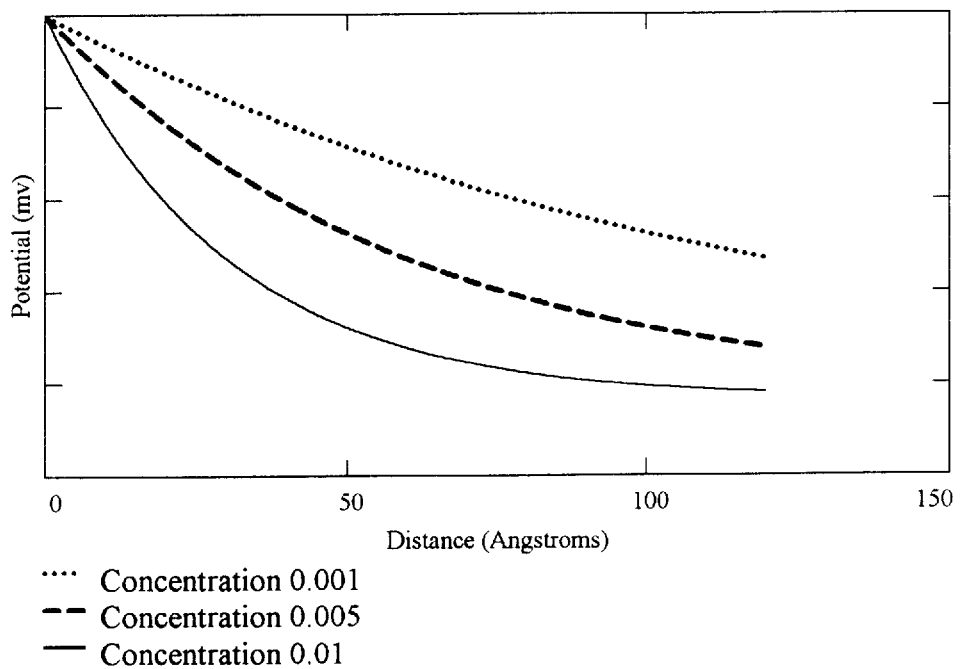
FIG. 13 is a perspective plot of activation overpotential versus distance from the surface to illustrate the influence of transient concentrations on the reaction rate.
Figure 14:
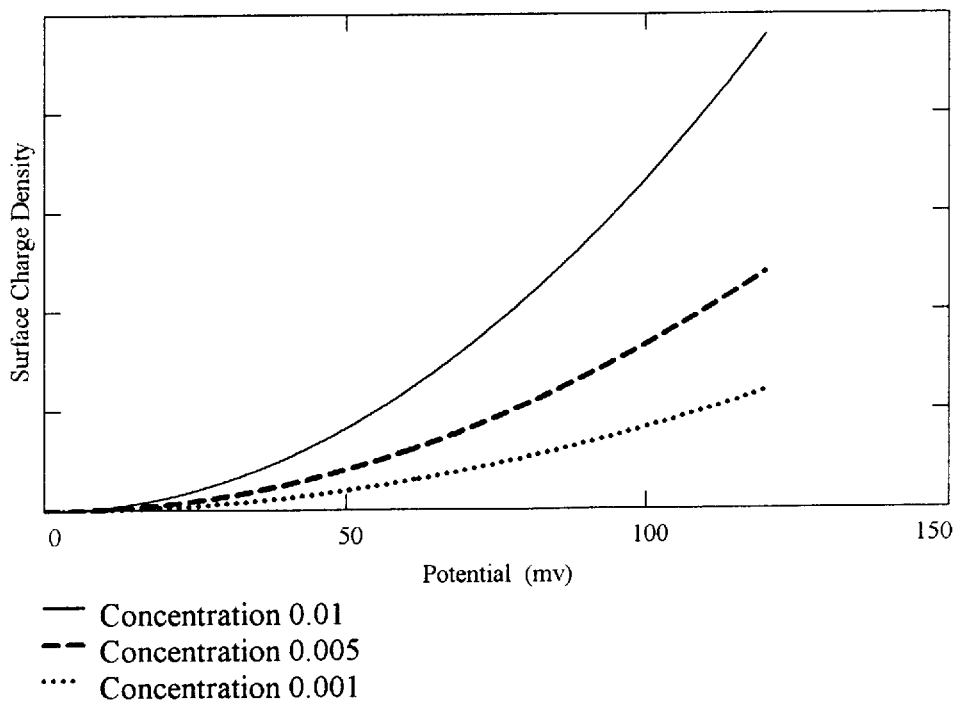
FIG. 14 is a perspective plot of surface charge density versus activation overpotential to illustrate the influence of transient concentrations on the surface charge density.

Another important factor is that outside the Helmholtz layer the reactant species are too distant from the surface to react. The significance is that the driving force for the reaction is the potential developed across the Helmholtz layer rather than the entire double layer structure. FIGS. 13 and 14 are derived from the Gouy-Chapman equations and have limitations at large potentials but are useful to illustrate two important properties. As illustrated in FIG. 13, the decrease in potential $\psi$, over distance, occurs more rapidly if the concentration is increasing. FIG. 14 shows that the surface charge density $\sigma$, for a given potential $\psi_o$, increases with increasing concentration.

Other factors control the overall reaction rate. The rate of the electrode reaction is controlled by the kinetics of the reaction as discussed. In addition, it is also dependent on the rate of mass-transport of reactants and reaction products to and from the reaction site. The three types of transport are convection, diffusion, and migration. Diffusion is the process where particles disperse from a region of high concentration to a region of lower concentration. Migration is the process where a particle moves from one region to another under the influence of a force, such as electromigration resulting from the application of an electric field.

A reaction is diffusion controlled if a high probability exists that the two species will react if they come into contact. A reaction is activation controlled if the reaction is highly dependent on the activation energy of the reaction itself. Historically, a system with mass-transport limits could be improved with electrolyte agitation. Similarly, high activation energy barriers were overcome with the addition of a catalyst or an increase in operating temperature.

When a potential is applied to an electrode, the charges accumulate on the surface and attract ions of opposite charge plus molecules that have a dipole moment. FIG. 11 illustrates this action. For clarity, FIG. 11 does not show the full extent of the presence of the other molecules and ions that occupy spaces in the solution. According to the rate equation, a reaction may slow because the reactants attempting to reach the reaction site must compete with other molecules there plus any reaction products accumulating at the site. Irreversible losses result from transport limitations and these factors are responsible for ohmic losses and heating. Vigorous mechanical stirring of the solution can increase the rate of mass-transport in such systems.

Nernst defined a diffusion layer thickness $\delta$ (not to be confused with the double layer effective thickness) that extends into the solution. The thickness of this layer is a convenient measure of the resistance of the system to mass-transport of reactants. The thickness of the diffusion layer can range roughly 0.01 mm to 0.5 mm. The thickness depends on the system hydrodynamics, such that, the thinner the layer the greater the fluid agitation and thus the better the mass-transport process. If a process is well stirred, the deposition or dissolution of material will not affect the hydrodynamics and thus δ.

If the current is increased to a point that the concentration at the surface approaches zero, a further increase in current must cause a different reaction to occur (usually undesired). This limit defines the limiting current density of a system. The limiting current density is inversely proportional to δ. Since the value of δ can range 50:1, the limiting current can vary over the same magnitude in response to changing conditions in the cell. An electrochemical system operated at the limiting current density is operating under mass-transport control.

In a system operating below limiting current density, the rate of the electrode reaction is the rate that species are deposited or dissolved as a function of the current density. Current density depends on the driving force and is greatly influenced by the activation or surface overpotential and the concentration of the solution at the reaction site. Again, the reaction rate is dependent on the conditions prevailing at the interface. With a high stirring rate and turbulent flow, the limiting current density will be higher because the turbulent flow or mass-transport perturbation affects the limiting factors. However, for most electrochemical systems, mechanical stirring is not practical because of economical or physical restrictions.

Applying an electromotive force to charged particles in a solution will accelerate the particles. The velocity of migration of an ion is proportional to the charge or valence of the ion and the electric field being applied. As velocity increases friction will increase. The ion also experiences a random movement, or Brownian movement, as illustrated in FIG. 12. The illustration shows the effects from electromigration. With the application of an external field, the ion will drift in the direction of the electric field. In FIG. 12, the ion, without an electric field applied, starts at point A and experiences three collisions before ending at point B. With the electric field applied, the same ion might start at point A and experience two collisions before ending at point C. The result of the electric force is a displacement in the direction of the applied force. The drift velocity of an ion is the average velocity in the direction of the applied field. The vectors shown in FIG. 12 crudely show the result of the collision if the ion had not been under the influence of the electric field. Note that FIG. 12 is a two-dimensional representation in the x and y plane only and an ion is free to move in the z plane as well.

The effective viscosity in the diffuse layer is affected by the application of the electric field and the resulting drift or electromigration of the ions in the field. This change in viscosity results in an electrophoretic effect or retardation. The retardation causes an ionic atmosphere to move in a direction opposite to the motion of the central ion thus reducing the ion's natural velocity. Also, the Helmholtz layer is very immobile because the forces are so strong that the lifetime, in this layer, of an ion or polarized molecule is long. Any reactant species entering the double layer region have to compete for access to the surface. But the electric field suppresses the reactant ion's natural three-dimensional Brownian motion. Without the applied electric force, the ion is free to move laterally or in a reverse direction until it can find a suitable reaction site. Suppression of the Brownian motion can severely limit the ion's ability to move to an available site. The combination of these factors contributes to the development of a time lag in the ion's response to transient changes in the electromotive force. The result is an increase in the activation overpotential caused by the effects on the double layer structure and an increase in concentration overpotential caused by the localized depletions of ions. Depending on the electrochemical process involved other negative effects can result, such as parasitic gas evolution, passivation of electrodes, dendrite growth, and/or poor electroplating or electrocrystallization.

The electric mobility u ($m^2$/Vs) of an ion is its drift velocity (m/s) in the field (V/m). The displacement of an ion under a DC field can be estimated from the equation:

$$dx = u\ E\ dt = u\ J\ \kappa\ dt$$

The values of u can be found in various chemical reference books. The current density is expressed as J and the conductivity as κ. For example, using a 0.0005 $m^2$ surface area, a 1.0 ampere current, and conductivity of 0.2/Ωm, the theoretical displacement of a typical metal ion in a battery is 24 micrometers in one second. This displacement is roughly 8,000 times greater than the width of the electrical double layer thickness. For ion movement relative to the double layer, applying long duration DC pulses exacerbates polarization.

A transfer function is a frequency-domain definition of the ratio of a system's output response to an input stimulus versus frequency. A time-domain LaPlace transform yields the transfer function:

$$G(s) = \frac{Y(s)}{X(s)}$$

The transfer function equation can be rearranged in terms of the output response Y(s) with Y(s) being equal to the natural response G(s) times the forced response (input) X(s). The natural response is a function of the poles of the transfer function and the forced response being a function of the poles of the input function. Transfer functions are classified by the number of reactive elements. A system with resistance, inductance, and capacitance (RLC) is classified as a $2^{nd}$ order system. Real systems are usually multiple ordered but often the elements can be lumped together and the system analyzed as, what Kou called, the prototypical $2^{nd}$ order system. A $2^{nd}$ order system is represented by a quadratic equation with two roots (poles). If the roots are real but different, the system response is overdamped. If the roots are real and equal, the system response is critically damped. If the roots are complex then the response is underdamped. The transfer function is:

$$G(s) = \frac{\omega_n^2}{s^2 + 2\zeta\omega_n s + \omega_n^2}$$

The term ω is equal to 2 πF, $\omega_n$ is the undamped natural frequency at critical damping, and ζ is the damping factor. The terms are related to the circuit elements by the following relationships:

$$\omega_n = \frac{R}{2\zeta L} = \frac{1}{\sqrt{LC}}$$

An additional relationship is expressed by the quality Q. Q is a dimensionless quantity that defines the ratio of the reactive impedance to the circuit resistance as follows:

$$Q = \frac{X}{R} = \frac{\omega L}{R} = \frac{1}{\omega CR}$$

Figure 4:
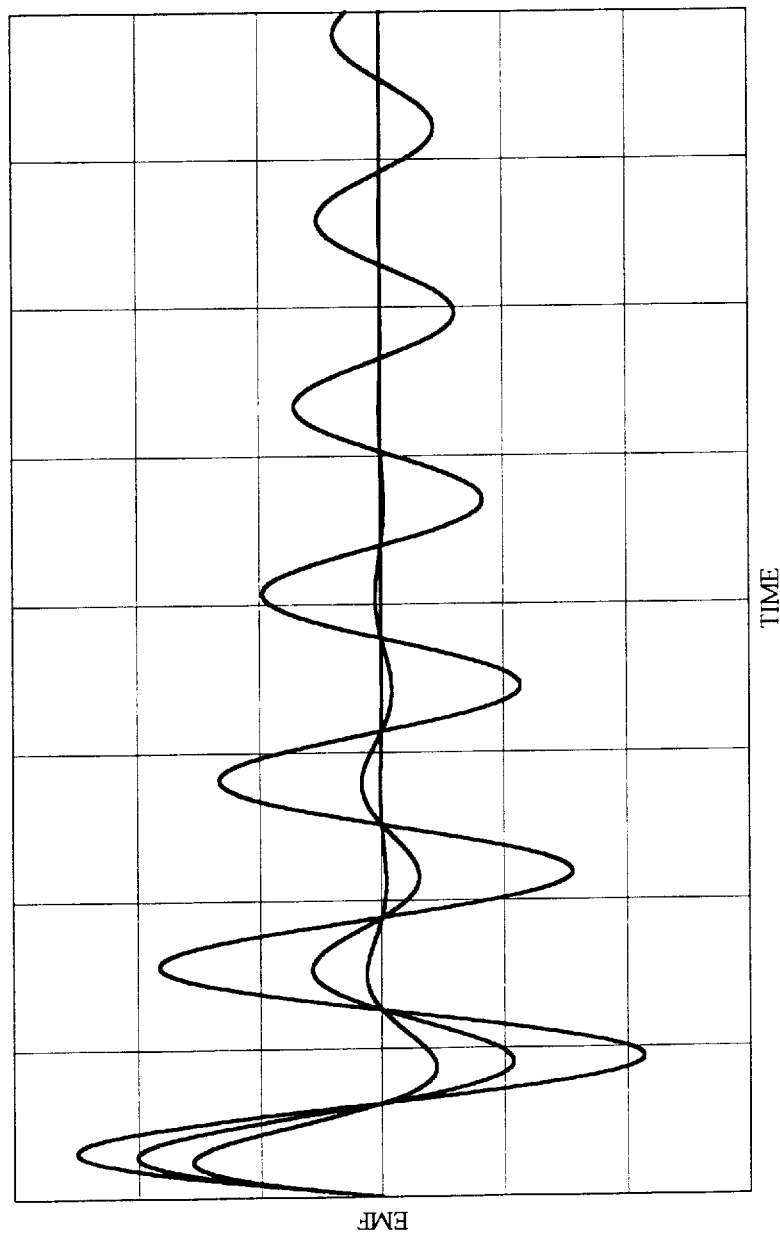
FIG. 4 is a plot used to illustrate the three different concepts of reactive amplification occurring at system resonance, the effect of damping on circuit transient response, and the ability to manipulate the peak amplitude of the injected signal.

$\omega_n$ is also known as the system resonance point. All real systems have at least one resonance point. As the forced response X(s) at $\omega_f$ approaches $\omega_n$, the circuit Q increases. When $\omega_f=\omega_n$, Q is maximum and the circuit response to the stimulus is maximum. FIG. 4 illustrates this concept. This important source of natural process amplification has been overlooked in the electronic control of physical and electrochemical systems.

Many electrochemical systems depend on the use of a porous electrode. The porous electrode can be characterized as a distribution or gradient of reaction rates averaged over a large structure. This type of electrode can increase the effective surface area being exposed for reaction by a factor of $10^3$ to $10^5$. FIG. 23 shows an illustrative porous electrode.

The previously discussed principles governing reaction rates are applicable to the porous electrode but are complicated by the physical structure of the electrode. A complication develops because the solid particles are large enough to develop a double layer yet small enough that this double layer could overlap the double layer of an adjacent solid particle. Repulsion must develop between adjacent and overlapping double layer structures. The ratio of the electrode and electrolyte conductivities can vary over the structure so that the current density is rarely uniform and is usually highest at the interfaces. The electrolyte permeates the porous structure but the problem of localized concentration polarization can be highly amplified. Non-uniform current density can lead to localized depletion of reactants and accumulation of reaction products; parasitic side reactions; poor material utilization; irregular shaped deposition; and morphological changes in the crystal structure. Potential and concentration gradients that exist promote non-uniform current density. Because diffusive processes are slow, the porous electrode is usually mass-transport limited.

FIG. 23 can help visualize the effect of a long duration DC emf on the porous electrode. The ions will be forced to migrate toward the metal current collector for long periods. From the earlier example, the drift would be 24 $\mu$m in one second before a depolarization pulse. As seen, this makes it difficult for the hydrated ions to deposit on surfaces that are parallel to and facing the current collector. Also, the curved surfaces of the solid particles exert a pressure that is higher in the phase on the concave side and this complicates the interchange of species in the reaction. Deposition or electrocrystallization can be poor because solidification requires good nucleation and growth but the structure and the applied DC electric field increase the chances for poor nucleation. Poor nucleation can result in the formation of dendrite at the interfaces.

The localized polarization problems have been recognized for a long time and many techniques have been developed to limit the undesired polarization. It is well-known that using pulsed DC improves the efficiency of electroplating. The theory is that the pulse is applied for a duration of time that is shorter than the time it takes for any significant concentration polarization to develop. In U.S. Pat. No. 5,039,381, issued to Mullarkey, a very low-current-density electroplating method is described that superimposes a high frequency (greater than 1 MHZ.) ac emf on the DC to enhance the diffusion and electromigration in the absence of convection. The field is applied in an orientation that enhances the natural settling of the ions from the forces of gravity. The high frequency emf improves the uniformity of plating. In U.S. Pat. No. 5,550,104, issued to Bhattacharya, the electrodeposition process superimposes a square-wave ac emf on the DC. Fractal pulsed currents are used in U.S. Pat. No. 5,486,280, issued to Bullock et al, for electroforming or deposition processes.

Since at least the late 1960's, it has been well-known that using pulsed DC improves the charging efficiency of batteries. The widely distributed and highly acclaimed GE Nickel-Cadmium Battery Application Engineering Handbook outlines these techniques. Since then, many U.S. Patents have been issued for various techniques that use pulsed DC techniques to improve the charge efficiency.

Noteworthy, earlier U.S. Patents include, U.S. Pat. Nos. 3,597,673 and 3,614,583 issued to Burkett et al and U.S. Pat. No. 3,617,851 issued to Du Puy et al. The inventions in these patents apply a continuous or pulsed DC charge with a relatively long duration followed by a discharge pulse (load) of short duration. The discharge pulse is applied to depolarize the battery. The primary difference between the inventions is the frequency and duration of the applied pulses. U.S. Pat. No. 4,385,269, issued to Aspinwall et al, described a pulsed DC charge followed by a depolarization pulse and a second technique of applying a two-tier pulsed DC charge followed by a depolarization pulse. The duration of the charge pulse was about ten seconds and the depolarization duration was roughly two seconds. In U.S. Pat. No. 4,746,852, issued to Martin, the 1 second pulsed DC charge was followed by a 5-millisecond depolarization pulse. The charge and depolarization pulses were then followed by a 15-millisecond measurement period. U.S. Pat. No. 4,829,225, issued to Podrazhansky et al, introduced a pulsed DC charge of 0.1 to two second duration followed by a depolarization pulse of 0.2 to 5 percent of the duration of the charged pulse. The charge and depolarization pulse was followed by a rest period that exceeded the duration of the depolarization pulse. The rest period was further defined as an ion stabilization period of about 7 to 20 milliseconds. It was claimed that the rest period had beneficial results by allowing the ions to find their position between the battery plates. In U.S. Pat. No. 5,307,000, issued to Podrazhansky et al, a single or double DC pulse with rest period was followed by a plurality of depolarization pulses with rest periods. It was claimed that the discharge pulses served to create and disperse ions throughout the electrolyte. Multiple depolarization pulses were used so that natural chemical and electrical gradients within the battery would also serve to disperse the ions more evenly. The charge pulse had a duration of at least 150 milliseconds, the depolarization pulses had a duration roughly 0.4 percent of the charge pulse, and the waiting periods varied over a range of 0.4 to 2.4 percent of the charge pulse. A further claim described how the high discharge current would cause the diffusion layer to break up and the waiting period allowed time for the ions to migrate away from the plate. This action caused the plate to be more receptive to a high charging current pulse.

U.S. Pat. No. 5,063,341, issued to Gali, applies very fast rate-of-rise pulses ($5 \times 10^6$ V/s) that exceeds the ion transport limits to break-up lead sulphate deposits in lead-acid batteries. In U.S. Pat. No. 4,740,739, issued to Quammen et al, the battery is charged with DC but includes high frequency discharge pulses to scrub hydrogen gas bubbles from the electrodes. The transformer secondary winding has a high reactance to isolate the ac input from the discharge pulses.

Figure 15:
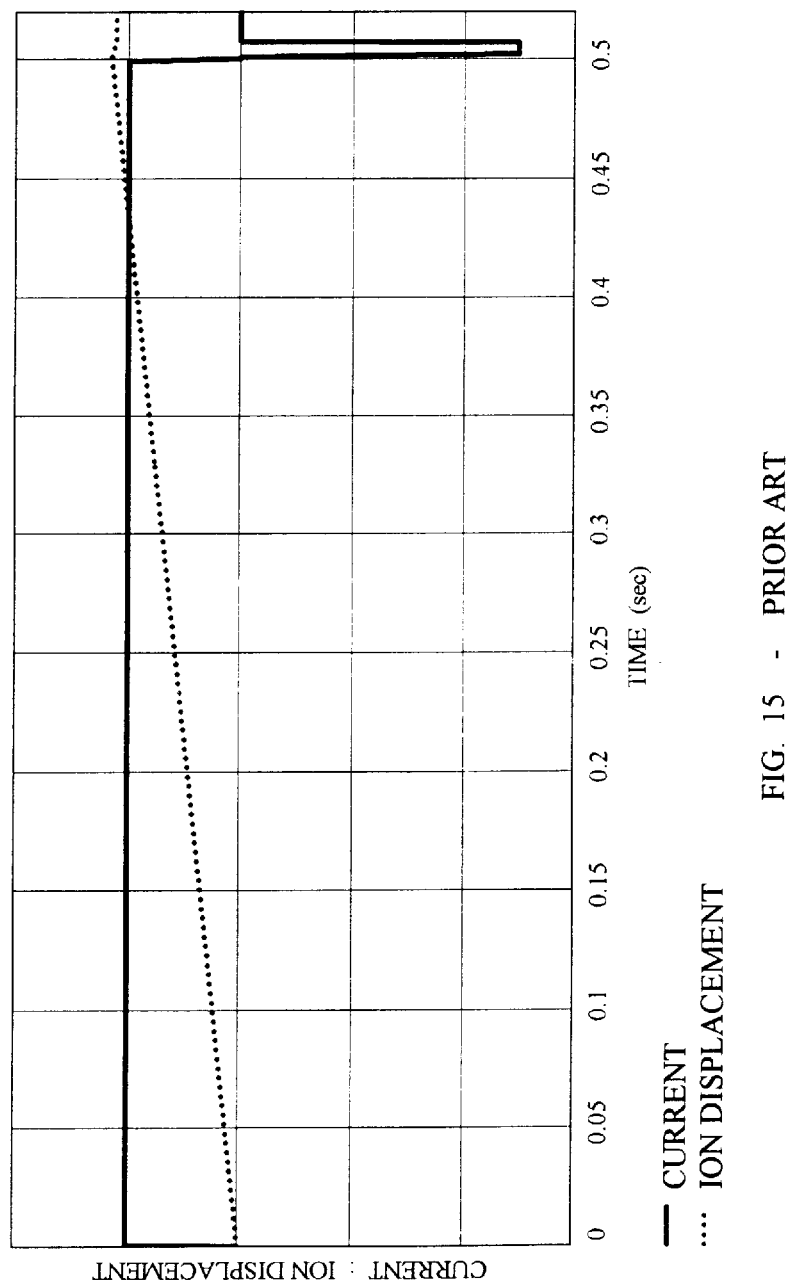
FIG. 15 is a plot of current versus ion displacement representative of typical pulsed DC methods in many prior art processes.

One common attribute and problem with prior art is the dependence on DC, whether continuous or pulsed. The major advantage claimed, in all of the inventions discussed, is an improved method-of or result-from applying depolarization pulses. FIG. 15 illustrates a waveform typical of prior art inventions. The use of DC causes a polarization overpotential to develop that reduces the charge acceptance and this polarization must be dealt with to achieve reasonable charge acceptance. The overpotential that develops is a combination of activation and concentration overpotentials. Remember that an overpotential is a deviation in the electrode potential necessary to cause a given reaction. The losses that result are irreversible and lead to the generation of heat. All of the prior art processes cause a polarization build-up.

Figure 21:
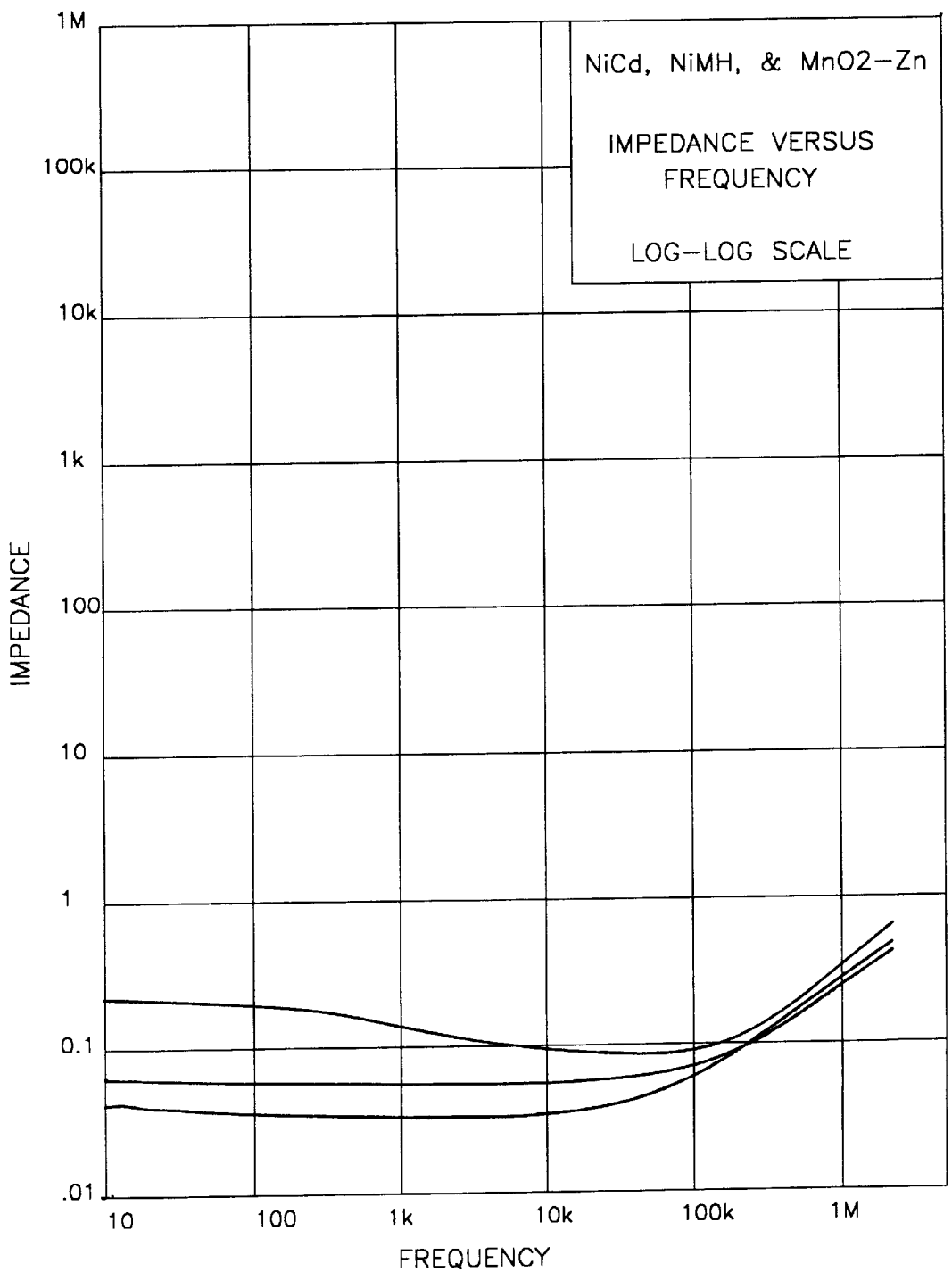
FIG. 21 is an impedance versus frequency plot for several types of battery systems.

The DC pulses described can be analyzed as a DC step function. A Fourier analysis of an ideal step function would yield harmonics out to infinity. In practical circuits, the step functions are far from ideal but the rise times are very fast and the harmonic energy generated extends to very high frequencies. A time-frequency domain transformation reveals that the continuous spectrum's envelope extends to the corner frequency $f_1=1/\pi\tau$, with pulse width $\tau$. For a 100-nanosecond rise time $t_r$, the $2^{nd}$ corner frequency $f_2$ would be about 3 MHz. The envelope amplitude decreases after $f_1$ at the rate of −20 dB/decade and −40 dB/decade after $f_2$. Experimentation reveals that ions have a transient response time on the order of 1 to 10 microseconds. Various measurement methods can determine this value and FIG. 21 illustrates one method. FIG. 21 is a plot of the impedance versus frequency, plotted on a log-log scale, for several types of batteries. A pulse can rise faster than the ions can deliver the charge. If a pulse's rate-of-rise exceeds the ions' transient response time, the system must (by definition) be mass-transport limited. Under this condition, the limiting current density is momentarily exceeded and the energy in the pulse must be converted to heat by some undesired process.

Figure 20A:
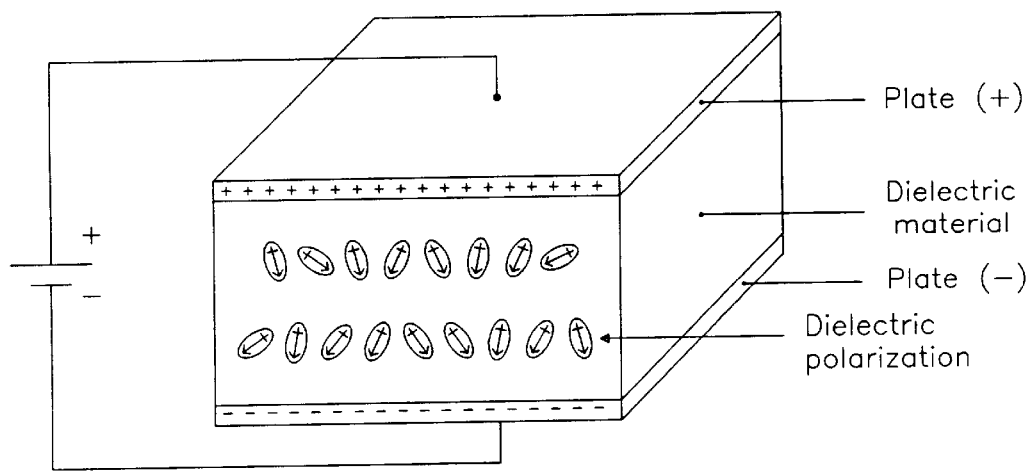
FIGS. 20A and 20B illustrate the structure of a parallel plate capacitor, dielectric polarization, and dielectric loss from the application of an alternating field.
Figure 20B:
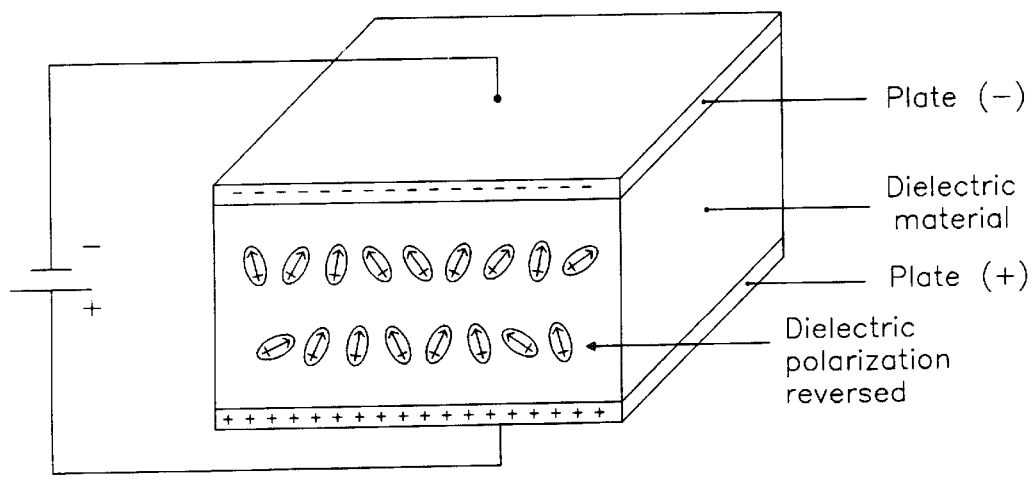

As stated earlier, each application of pulsed DC charges the double layer capacitor on the leading edge and discharges it on the falling edge. FIGS. 20A and 20B show the physical structure of a parallel plate capacitor. The capacitance developed by a parallel plate capacitor is:

$$C = \epsilon \frac{A}{d}$$

The permittivity of the dielectric is represented by $\epsilon$, the plate area by A, and the distance between the plates as d. From the equation the capacitance is obviously directly related to the permittivity of the dielectric. In a double layer capacitor, the polarized water dipoles form the dielectric material. FIG. 11 shows the structure of the electrode-electrolyte junction that forms the double layer capacitor and the physical relationship of the water dipoles to the electrode. In a liquid the dipoles are easily polarized. In the IHP, the surface charge causes the dipoles to be highly polarized. However, in the OHP the dipoles are more highly influenced by the ions than the surface charge. If the concentration of ions increases, the dielectric constant (permittivity) decreases thus the capacitance decreases. Likewise, if ion concentration decreases then capacitance increases. The current required to charge the capacitance with DC follows the equation:

$$i = C \frac{dV}{dt}$$

The energy required to charge and discharge the double layer capacitor is wasted since it does not contribute to the electrochemical reaction. Because of the overpotentials that result, the application of DC pulses can reduce the effective reaction rate.

Figure 24A:
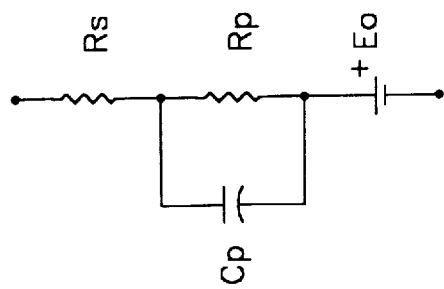
FIG. 24A is an equivalent circuit for an electrochemical cell and illustrates the classical view of a static cell with DC field applied, as described in prior art.

FIG. 24A shows an equivalent circuit for a typical battery cell and is compatible with the equivalent circuit described in the GE Nickel-Cadmium Battery handbook and other battery texts. A double layer structure will form at the solid-solution interfaces in an electrochemical system under the influence of an electromotive force. The GE handbook states that the time constant of $R_p C_p$ is approximately 1 to 3 seconds and that $R_p$ can be ignored with a pulse duration of less than 4 milliseconds (250 Hz). Other battery chemistries will have different time constants but the principles still apply. In one time constant $C_p$ would be charged to 63.2% or discharged to 36.8% of its final value. Charging a cell with a pulse duration on the order of one time constant and a short duration discharge pulse will charge the capacitor in a little more than 5 times constants. The depolarizing pulses slightly discharge the capacitor. From the earlier example, a one time constant discharge would result in a field strength of $36.8 \times 10^6$ V/m. The wait periods allow the ions outside the Helmholtz region to diffuse freely but the potential across the region holds the double layer structure essentially intact. The combination of short duration depolarization pulses and wait periods (less than 5 time constants) have little effect on the structure of the double layer capacitor and the activation overpotential that develops.

Depending on whether the cell is operating as an electrolytic or galvanic cell, the double layer structure at one electrode will dominate the overall reaction. If a particular electrode dominates the reaction with current flowing in a given direction then the other electrode dominates when the direction of current is reversed. With few exceptions, cations do not enter the inner Helmholtz plane because of Gibbs free energy restrictions. This fact means that the dielectric constant is very high and the capacitance is therefore very large. The effective capacitance of the cell is therefore dominated by the opposite electrode with the smaller capacitance. Claims that the depolarization pulses and wait periods breakup or eliminate the double layer ignore the physics of the structure.

Battery chargers that use 120 Hz rectified DC pulses, typical of the 1960's and as described in the GE Nickel-Cadmium handbook, are effectively pulsed DC to the double layer capacitor. The rest or off periods are of longer duration than newer technologies but short enough that the capacitor reaches full charge in a short time. However, the rest periods are of sufficient duration that they waste significant energy in the charge and discharge of the double layer. Because the rest period is of relatively short duration, the measurement of the 'trough' voltage during the off period is not the true open-circuit voltage of the cell, as often claimed. The newer techniques, discussed above, suffer because the rest periods are too short, compared with the time constant of the capacitance, to discharge the overpotential. The measurements are free from the instantaneous 'IR' losses associated with the concentration overpotential but still have an overpotential error.

The heating and various polarizations effects of the continuous or pulsed DC charging complicate charge termination in a battery. The voltage-pressure-temperature relationships in a battery under charge are well-publicized. Allowing a battery to receive an overcharge at high-C rates is very detrimental to the operating life of a battery. Open-circuit voltage, adjusted for ambient temperature, is a suitable means of charge termination for many battery systems. For other systems, physical or electrochemical factors highly influence the open-circuit voltage so the change in voltage per unit of time (dv/dt) is a more accurate indication of full-charge. Operational and charge factors also influence the dv/dt method and the finite change can be too small to detect reliably or accurately. The internal temperature rise (dT/dt) in the battery is also an indication that the battery has reached full-charge but the heating that results from inefficient charging also complicates the measurement. Many of the U.S. Patents discussed, described more complex methods of detecting full-charge that generally require complex control circuitry, such as a microprocessor. Despite the complex charge termination techniques, reduction from the high C-rate current is necessary before reaching 100% charge to avoid damaging overcharge. Avoiding unnecessary polarization and heating would allow the reliable use of simple voltage and temperature measurement techniques.

An additional problem with long duration DC is the ionization of water at the electrodes as a parasitic side reaction. FIG. 11 shows the water dipole's relationship to the positive electrode. The longer the DC potential holds the water dipole tightly to the surface the greater the chance that the water will dissociate into $H^+$, $O^{-2}$, and $OH^-$. Because of the strong attraction, oxygen may adsorb at the positive electrode and hydrogen may be adsorbed at the negative. The remaining elements (by-products) may impede the overall reaction or cause other problems such as gas pressure build-up.

As discussed, when the DC pulse duration is long, compared with the transient response time of the ions, the process can be analyzed as continuous DC. It is well-known and documented that transient response techniques can be applied to electrochemical systems to separate out the various overpotentials for individual analysis and measurement. Other than pulsed DC, techniques that take advantage of the ion's natural transient responses have not been applied to electrochemical processes to optimize the overall reaction rate.

No prior art chargers continuously adjust the charge pulse amplitude based on the changing conditions in the battery. In U.S. Pat. No. 4,829,225, a two-staged charge technique is used where the second stage changes to a reduced peak amplitude just before full charge is reached. The amplitudes in the two-stages are different but fixed. In U.S. Pat. No. 4,385,269 a two-tier pulse uses two different current values but the amplitudes are fixed. Except U.S. Pat. No. 4,829,225, none of the inventions adjusts the amplitude of the depolarization pulse in response to changing battery conditions. In U.S. Pat. No. 4,829,225, the amplitude of the depolarizing pulse is increased or decreased based on the charge level of the battery. An important fact overlooked is that the impedance of an electrochemical cell can change significantly over a full operational cycle. For example, a NiCd battery has a nearly flat impedance value until the cell reaches a certain depth-of-discharge and then the impedance increases rapidly. The high impedance is a result of morphological changes in the crystal structure and indicates that the charge acceptance is very low. The GE Nickel-Cadmium handbook illustrates that the charge acceptance can initially be very nearly zero with a high depth-of-discharge (called zone 1). Applying high C-rate pulses during the early phase of charging causes high IR losses (heating) and parasitic side reactions (pressure build-up and heating).

In U.S. Pat. No. 4,728,877, issued to Adamson, the logarithmic current to voltage relationship of a diode is used to control the current applied to a battery. The diode's logarithmic relationship is apparently intended to mimic the logarithmic current density to overpotential relationship defined by the Tafel equation. The invention claims that the electrochemical process, in effect, controls the current source. Several problems exist with the process. The first problem is this logarithmic relationship only exists over a very small range of the diode's forward voltage drop. This means that the technique only occurs over roughly the last 100 mV of the charge cycle, less than 1% in the example given. The GE Nickel-Cadmium handbook explains that the charge acceptance at this stage of the cycle (called zone 2) is nearly 100% so the possible benefits are very small. Further, the claim that this technique repolarizes the electrodes contradicts the claim of improving the electrochemical process. In fact, the changes in overpotential (polarization) are necessary to cause the voltage-current perturbations (oscillations). This (re)polarizing of the electrode increases the kinetic resistance and impedes the reaction. The effect of the current-voltage perturbations is a substantial increase in (re)polarization as claimed. A second problem is the extreme temperature dependence of the process on ambient temperature. A diode has a negative temperature coefficient for the forward voltage drop but a positive temperature coefficient for current and the current has an exponential response to temperature. As the ambient temperature increases, the charge current and terminating voltage applied to a battery should be decreased. In this invention, the current and terminating voltage will increase. Even with the correct temperature compensation, the current would vary greatly over a normal operating temperature range. The invention depends more on the current-voltage-temperature relationship of the current source (diode) than the electrochemical process as claimed. Further, this relationship makes it virtually impossible for this process to control other electrochemical processes effectively. The claim to break down or reduce the electrical double layer is unattainable. The process still requires the use of a depolarization pulse.

A battery is an example of an electrochemical system that can be used in either an electrolytic (energy consuming) or galvanic (energy producing) process. Batteries are often charged with pulsed DC and a depolarizing pulse. The application of the depolarizing (energy consuming) pulses momentarily converts the battery to a galvanic cell but the intended operation is an electrolytic process. Except as noted, transient response techniques are used to improve the reaction rates for electrolytic processes but not for galvanic processes.

The ambient temperature is often used as a factor in the decision to inhibit or reduce charging (electrolytic process) to a battery at values above or below a certain temperature. Although previously undisclosed, thermal compensation can also be applied to a battery in other ways during charge. The negative-temperature-coefficient (NTC) of pn diodes can be used to match the battery's natural NTC characteristics. This NTC characteristic can be used to reduce the peak and average current delivered to the battery and reduce the battery's open-circuit voltage termination point. Historically, temperature compensation has not been applied to protect a battery operating in a galvanic mode.

Battery packs (multiple cells) often integrate a control circuit, such as a microprocessor, into the pack to monitor the battery's charge and discharge cycles. U.S. Pat. No. 4,289,836, issued to Lemelson, integrated a microprocessor into a pack for sensing and controlling the battery charging. The control circuitry usually monitors the current entering or leaving the battery. The control may combine the charge and discharge current with an estimate of self-discharge, including a temperature compensation factor, to predict the available charge capacity of the pack. Additionally, charge termination can be made via the control circuit by sending a control signal to the external power source to terminate charge. In more complex applications, the internal control circuitry communicates with an external programmable power supply via a serial bus. U.S. Pat. No. 5,572,110, issued to Dunstan, describes this type of system. The control can specify the power supply's current and voltage levels to match the battery chemistry. This last technique allows the programmable power supply to be safely used with various battery chemistries. In U.S. Pat. No. 5,471,128, issued to Patino et al, a battery undervoltage protection circuit is described. U.S. Pat. No. 5,569,550, issued to Garrett et al, overvoltage protection for the battery is added. In U.S. Pat. No. 5,218,284, issued to Burns et al, a switching power supply is included to control both the charge and discharge current levels. Except as noted, the control circuitry does not actively enhance the discharge performance of the battery in a galvanic mode of operation.

All battery systems experience the problems of voltage depression (memory) and self-discharge. The severity of the problem is different from system to system and varies significantly with operating conditions. One major cause is morphological change in the crystal structure. These changes primarily occur in areas of the crystal where the material has been inactive. When the material is inactive for extended periods, the crystal structure can change size. When this change occurs, the material becomes less active and is not available to contribute to the reaction. Long-term storage and shallow discharge followed by taper charging results in areas where the material is inactive for long periods. The inactive material can be conditioned and restored by the application of several deep discharge/charge cycles. The problem is deep discharge cycles are detrimental to the operational life on all battery systems. Conditioning is time consuming and generally unavailable. The problem with self-discharge is that the battery is not available on-demand without recharging or a special maintenance program to test periodically, possibly condition, and recharge the battery.

Charge transfer occurs several ways. Electrons transfer the charge in metals and semiconductors whereas ions transfer charge between a metal and a solution of its ions. The three forms of transmission are electron flow, ion flow, and charge transfer reactions at the electrode-electrolyte interface. The equations relating the charge transfer steps of ions and electrons are very similar.

Figure 19A:
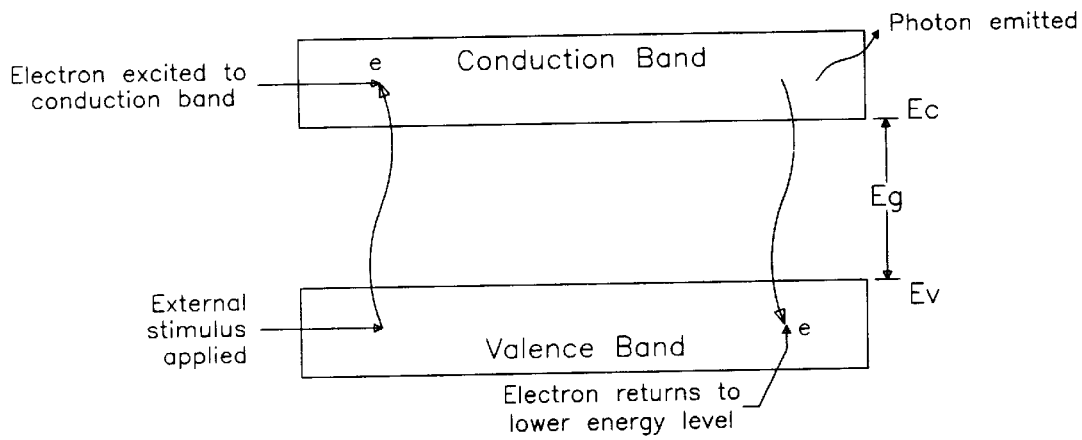
FIGS. 19A and 19B illustrate the electrokinetic behavior of electrons in flourescent and phosphorescence materials.
Figure 19B:
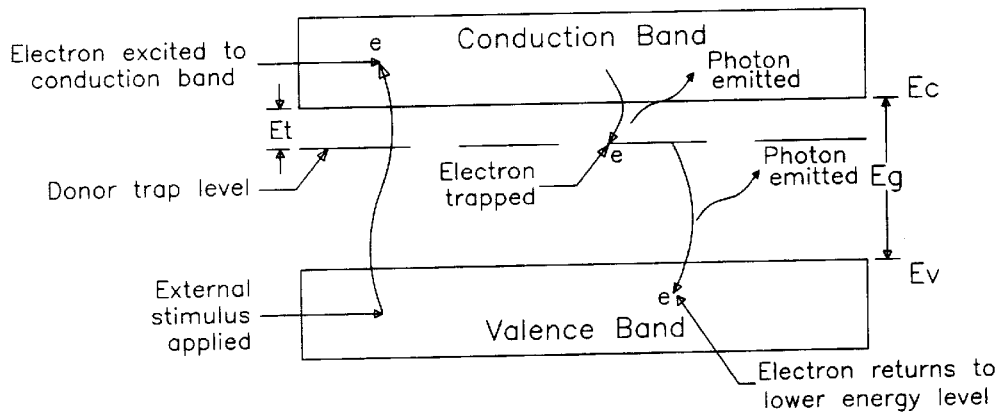

Two systems that rely on electron charge transfer are illustrated in FIGS. 19A and 19B. These systems have historically relied on an alternating current electromotive force to provide activation energy. A flourescent system is shown in FIG. 19A. In this system, the valence band and conduction band are separated by an energy gap, shown as $E_g$. When a stimulus is applied, an electron gains sufficient energy to jump to the conduction band. Obeying the natural tendency to return to the lowest energy level available, the electron gives up the extra energy and drops down to the valence band. In the process a photon is emitted. The wavelength of the light emitted depends on the width of the energy gap. In this situation, the wavelength is emitted in the visible band so useful light results. The emission of light stops when the electrical stimulus is removed. Increasing the frequency of the applied ac waveform increases the frequency that light is emitted and effectively increases the light output. The problem with prior art is that the control circuitry that provides the most efficient light output is much more expensive than the less efficient but cheaper 60 Hz control circuitry. A primary reason for the high cost is the complex circuitry needed to produce the higher frequency (40 kHz) ac waveform. Dimming can save additional energy when applicable but the additional circuitry cost is prohibitively higher.

A phosphorescence system is shown in FIG. 19B. Again, an energy gap separates the valence and conduction bands. An additional energy level, shown as $E_t$, results from the introduction of a donor (impurity) into the material. When the electrical stimulus is applied, the electron gains the necessary energy to jump to the conduction band. When the electron drops back down, it emits a photon but then becomes trapped in the donor trap level. The electron will remain in the donor trap level temporarily before dropping back to the valence band. A photon will be emitted when the electron leaves the donor trap level. Because the electron is temporarily trapped in donor trap level, the phosphorescent material will continue to emit light for a short time after the electrical stimulus is removed. Historically, this type of system has been powered with complex ac power sources.

One phosphorescent light system of interest is the electroluminescent lighting strip. The light output efficiency of the strips is low and they can experience short operational life. Increasing the ac voltage's amplitude (up to 380 Vrms) and frequency (up to 8 kHz) can increase the light output. The conflict is that the operational life is inversely proportional to the ac voltage's amplitude and frequency. The physical structure of the material is similar to a parallel plate capacitor so that the impedance of the system is largely capacitive. Low-cost inverters are available for powering small strips, up to 20 VA. The technology for producing very large or very long strips is now available. However, the cost of 150 VA to 500 VA ac power supplies is prohibitively high and is hindering the acceptance of the systems. FIG. 20 is an illustrative drawing of a dielectric system similar to the electroluminescent strip. Current texts on the subject explain that the electroluminescent strips cannot be driven with DC and the upper operating range for ac is 8 kHz. As shown in FIG. 20, the application of an electromotive force polarizes the molecular dipoles in the dielectric material. If the potential is reversed as occurs with alternating current, the molecular dipoles must reverse 180°. The rotation introduces a dipole-friction and a displacement current flows. The result is that the dielectric loss increases with frequency. Molecular dipoles experience the highest dielectric loss at roughly 10 kHz. Corona discharge is a problem at the present levels of ac voltage. The corona can cause the plastic insulating materials to deteriorate rapidly. Being able to control the light output is highly desirable but the cost of dimming circuitry for the larger strips is prohibitively high.

OBJECTS AND ADVANTAGES

Accordingly, it is an object of this invention to provide an electromotive force (emf) that effectively utilizes the natural resonance or other physical properties of a system to optimize the electrokinetic behavior of the charged particles, and further, utilizes the reactive energy or amplification at resonance to increase the effectiveness of the process without an increase in the applied input average or DC power.

Additionally, it is an object of this invention to match the shape of the input stimulus' waveform (emf) to optimize the charged particles' natural movement or behavior, in particular, to normalize the input stimulus' amplitude and frequency to match the relative interactions between the charged particles and the physical structure of the process. As examples, the emf should maximize the natural Brownian movement of an ion and the prevailing diffusion process in a solution. The displacement, in time, of ions should be normalized to the physical distances of the electrical double layer.

An object of this invention is to produce an electronic catalytic effect in an electrochemical process by effectively reducing the activation overpotential, concentration overpotential, and energy loss in the electrical double layer thus reducing the activation energy needed for the reaction to occur. Further, it is an object of the electronic catalytic effect to increase the exchange current in the system's process thereby increasing the limiting current density with the result being an improvement in efficiency and throughput for the process.

An object of this invention is to provide an electronic method for providing mass-transport perturbation, especially including the electrical double layer, and further, to create an electromotive perturbation that is perpendicular to the electrodes that optimize the natural processes of Brownian movement, diffusion, and convection. Further, it is an object of the perturbation to optimize the concentration of reactants at the reaction sites and reduce the development of concentration gradients over the surface while maximizing the penetration within the porous electrodes, if applicable, thereby increasing the effective surface area of the electrodes. Still further, it is an object of the perturbation to improve the electrodissolution, electrodeposition, or electrocrystallization at the surfaces.

An object of this invention is to provide a process that utilizes the impedance of an active electrochemical system to control the amplitude of the applied emf, and particularly, to allow the system impedance to naturally damp the amplitude of the applied electromotive force thereby allowing automatic process control of the emf amplitude. Still further, it is an object to adjust the DC offset, peak currents, duty-cycle, and frequency of the control process to match the changing conditions of the system.

It is an object of this invention to avoid DC polarization thus eliminating a need for a depolarization pulse and thereby reducing the additional parasitic effects of the DC and depolarization pulse.

It is an object of this invention to obtain true open-circuit voltage and accurate closed-circuit voltage measurements during an active electrochemical process. Further, the improved voltage accuracy will increase the accuracy of coulometric measurements of charge, discharge, or self-discharge occurring in the system.

It is an object of this invention to provide an emf for battery charging that reduces the production of heat and overpotential thereby allowing simple voltage and temperature measurements to detect full-charge reliably and accurately. Additionally, the fast and reliable detection will avoid damaging overcharge, particularly, with high-C rate charging. Further, it is an advantage of the simple, fast, and reliable detection (of full charge) that high-C rate charging can be maintained until full-charge is reached, without protective current tapering. Still further, it is an advantage of the improved accuracy of voltage measurement and reliable detection of full-charge that safe higher rates of charging are possible.

An object of this invention is to provide process control, via transient-response and integral-transform techniques, that can be used to improve the reaction rate of both electrolytic and galvanic systems, and in particular, to provide a method that can be used to control battery performance during both electrolytic or galvanic modes of operation.

It is an object of this invention to provide a method for providing a control circuit (module) that can be integrated into a battery pack (multiple cells) to control both the electrolytic and galvanic modes of operation. Further, it is an object of this invention that the geometric shape and size of the module will be roughly equivalent to the space occupied by one cell in a multiple-cell pack. Still further, it is an object of the control module to contain active circuitry for controlling: (a) the input and output current; (b) regulation of output voltage; and (c) charge and discharge of the battery, including temperature compensation. It is an advantage of this invention that the personal safety of the pack user increases with active short-circuit and overcharge current protection and further the improved charge and discharge performance maximizes the operational life of the battery pack. An additional advantage is the overall reduction in system cost since an external battery charger will no longer be required and a low-cost, unregulated power supply can be used.

It is an object of this invention to provide an emf waveform that promotes the benefits of thicker electrodes without a loss of peak current capability.

It is an object of this invention to provide a process to exercise a battery during storage or periods of inactivity to reduce the effects of inactive material and self-discharge.

It is an object of this invention to provide a modified (alternate-method) emf waveform that offers many of the preferred waveform's benefits but is better suited for very high current applications.

A further object of this invention is to provide a low-cost process for powering luminescent systems that provides low-cost circuitry for dimming, and particularly in electroluminescent lighting systems, a DC emf waveform that: (a) effectively eliminates dielectric loss; (b) reduces corona discharge; (c) extends the operational frequency limit above 8 kHz; (d) increases output brightness; and (e) extends the operational life.

It is an object of this invention to provide safety, environmental, and economical benefits. Advantages include: (a) improved personal and system safety; (b) less energy consumption; (c) better material utilization; (d) reduction of electromagnetic interference (EMI) by eliminating high frequency harmonic energy; (e) tighter process control; (f) simpler circuitry; (g) lower costs; (h) longer operational life; and (i) higher throughput.

Further objects and advantages of the invention will become apparent from a consideration of the drawings and description that follows.

LIST OF REFERENCE NUMERALS

1 INJECTION-MEANS
2 WAVEFORM-GENERATOR
3 CONTROL-CIRCUIT
4 PROCESS
5 POWER-SOURCE
6 CONTROL-SIGNAL
7 CONTROL-SIGNAL
8 CONTROL-SIGNAL
9 COUPLED-INDUCTOR
10 CAPACITOR
11 INDUCTOR
12 SWITCH
13 DIODE
14 SWITCH
15 SWITCH
16 CAPACITOR
17 CONTROL-SIGNAL
18 CONTROL-SIGNAL
19 BATTERY
20 CONNECTION
21 CONNECTION

22 CONNECTION
23 EXTERNAL-CIRCUIT
24 INDUCTOR
25 CAPACITOR
26 DIODE
27 RESISTOR
28 RESISTOR
29 RESISTOR
30 RESISTOR
31 SWITCH
32 OSCILLATOR
50 SYSTEM
51 SYSTEM
52 MODULE
53 MODULE
54 SYSTEM

SUMMARY OF THE INVENTION

An electronic method is provided whereby the applied electromotive force optimizes the electrokinetic behavior of charged particles to match the natural electrical response and physical structure of the system. Electrokinetic behavior is the resulting charged particle motion caused by changes in the applied electric field. This method can be applied to a very broad field of applications that include physical, biological, and electrochemical systems, such as, electrolysis, batteries, and flourescent and electroluminescent lighting (photochemical) systems. This method can be applied to improve both electrolytic and galvanic modes of operation. An unexpected benefit of the method is that the circuitry needed to provide the optimized electrokinetic behavior is lower in cost than the existing circuitry.

DESCRIPTION OF THE PREFERRED EMBODIMENTS

FIG. 1 illustrates an electromotive force (emf) of the method that produces a desired charged particle displacement for optimized electrokinetic behavior. The emf takes the shape of an ideal damped sinusoidal waveform superimposed on a DC potential. Practical implementations of this method will deviate from the ideal shape shown. The waveform takes the form:

$$emf = f(x) + h(x)$$

The function f(x) is the sinusoidal wave with exponential decay and takes the form:

$$f(x) = A \times \exp-\left(\frac{x}{B}\right) \times \sin(C \times x)$$

The value A establishes the amplitude, B defines the rate of decay, and C sets the frequency of oscillation. The function h(x) defines the offset and takes the form:

$$h(x) = D \times \frac{\operatorname{atan}(R \times x)}{\pi}$$

Value D is an offset multiplier and value R sets the rate of approach to the offset.

In FIG. 1, a first positive peak causes an initial positive displacement of the charged particle. As the waveform approaches the zero point, the slope of the displacement approaches zero. As the waveform continues the potential becomes negative and the charged particle displacement also becomes negative. The negative displacement is roughly ⅓ of the initial positive displacement. As the emf waveform again approaches zero potential, the slope of the charged particle displacement again approaches zero. At a second peak, the emf continues to increase positively and the displacement again becomes positive. The positive displacement of the $2^{nd}$ positive peak is roughly ⅔ of the initial first positive displacement. As the emf approaches zero potential, the slope of the charged particle displacement approaches zero for a third time. A second negative emf peak causes a negative charged particle displacement that is roughly ⅓ of the positive displacement caused by the second positive emf peak. This process continues for one more oscillation cycle. As the emf waveform is reduced or damped the resulting charged particle displacement is also reduced. FIG. 1 shows one process cycle with three oscillation cycles. At the end ofthe third oscillation cycle, at time=60, the process cycle would begin again.

Figure 2A:
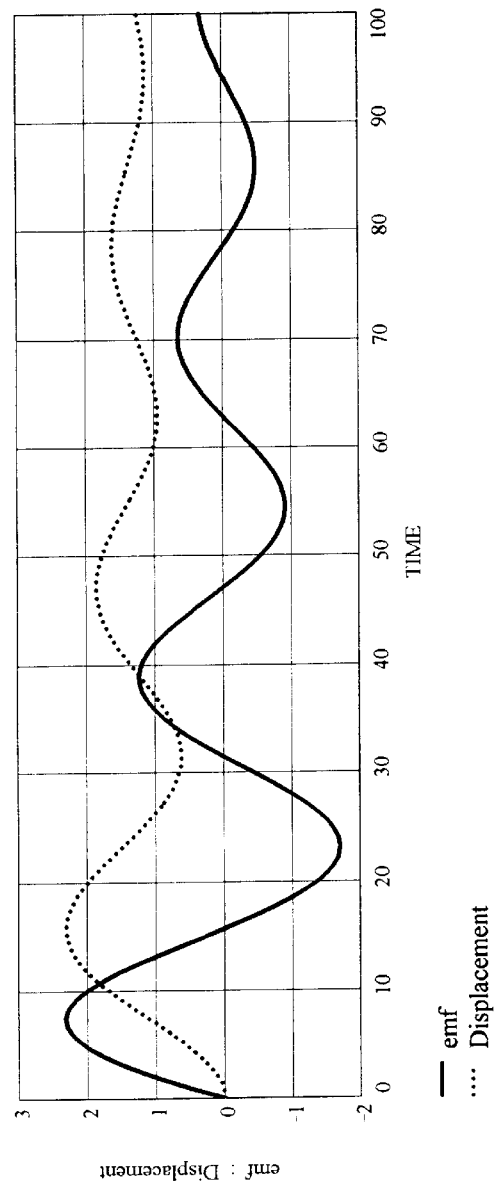
FIGS. 2A and 2B illustrate waveforms for the applied electromotive force and the resulting charged particle displacement with and without a DC offset.
Figure 2B:
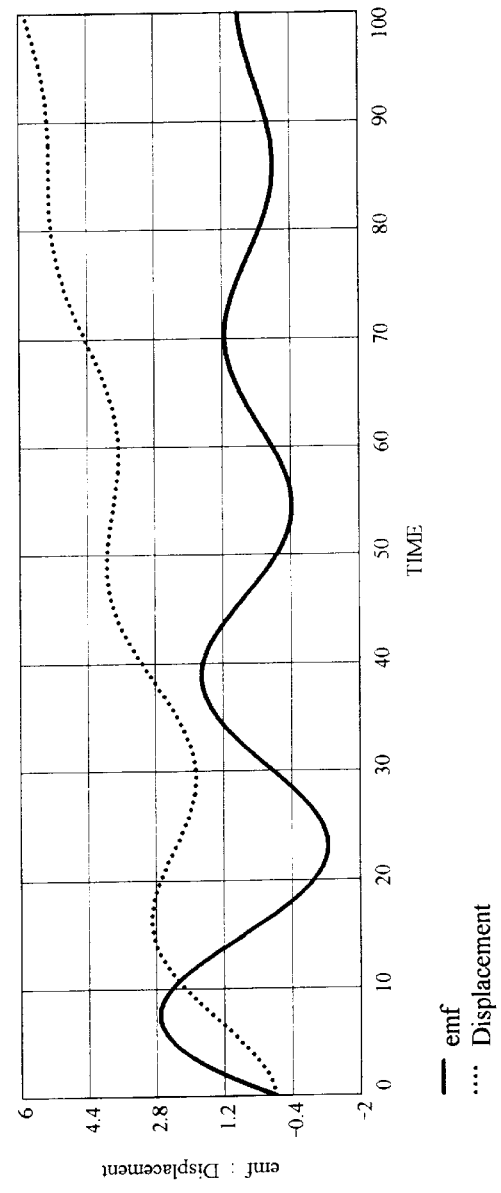

FIGS. 2A and 2B depict the effect of a DC offset on a damped sinusoidal emf. The emf waveform follows the format described for FIG. 1. FIG. 2A shows a damped sinusoidal emf with no DC offset. A positive net displacement will result because the emf's leading positive peaks have greater amplitude than the following negative peaks. FIG. 2B shows a damped sinusoidal waveform with a DC offset applied that is similar to FIG. 1 but with different peak amplitudes. FIG. 2A shows greater negative charged particle displacement per unit of time than FIG. 2B. FIG. 2B shows roughly a 5 to 1 increase in net positive displacement per unit of time than FIG. 2A.

Figure 3A:
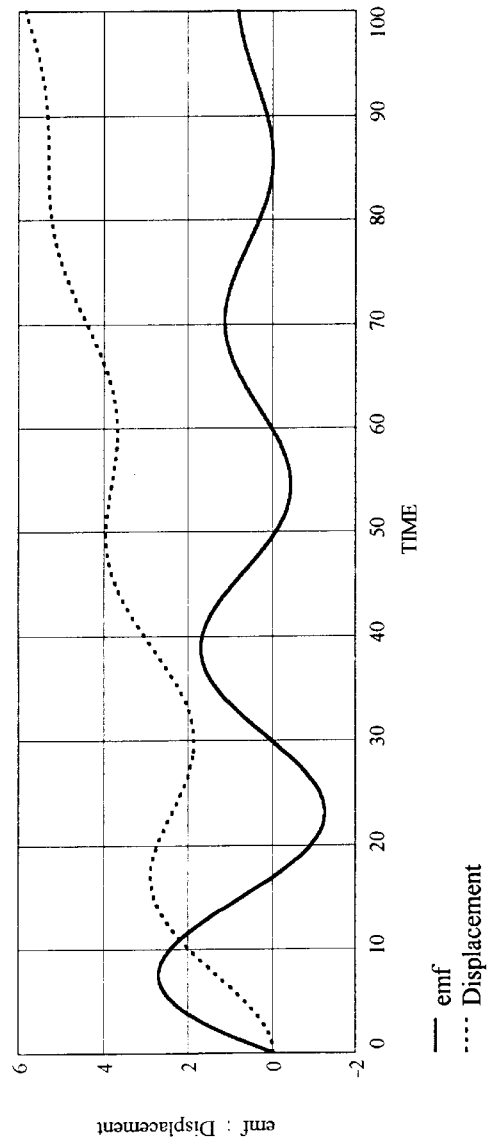
FIGS. 3A and 3B illustrate the electromotive force and resulting displacement waveforms when the frequency of oscillation is changed.
Figure 3B:
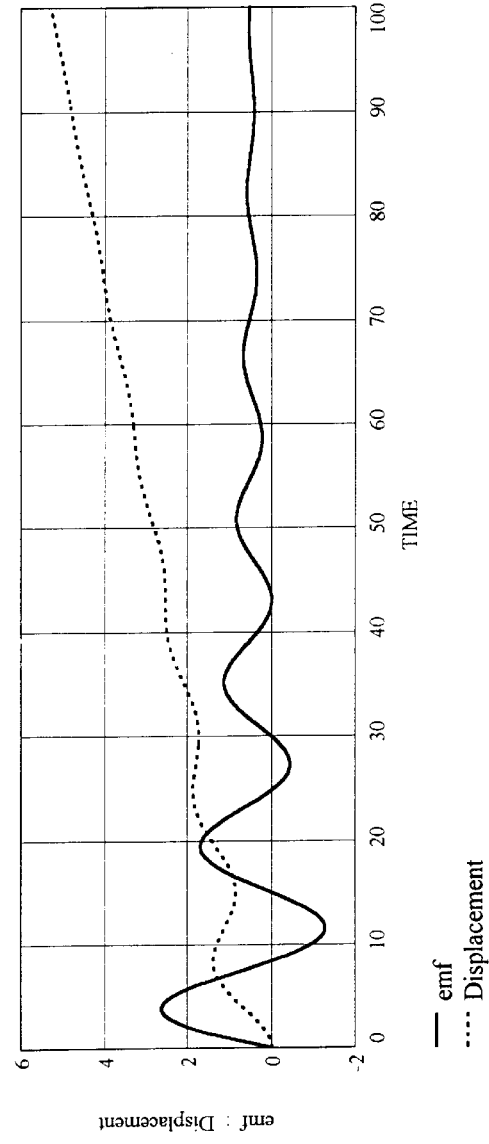

FIGS. 3A and 3B show two damped sinusoidal waveforms with identical peak values and DC offset but operated at different frequencies of oscillation to illustrate the effect on charged particle displacement. FIG. 3A shows an emf at base (1×) frequency and a resulting charged particle displacement in time. FIG. 3B shows an emf at twice the base frequency and a resulting charged particle displacement in time. For comparison purposes only, FIG. 33B shows roughly 6 oscillation cycles but in a practical application a second process cycle would begin at time=50. The comparison illustrates that increasing the frequency of oscillation results in a decreased displacement in time.

FIG. 4 shows a damped sinusoidal waveform with different peak amplitudes.

FIG. 6 shows a block diagram of the essential elements needed to implement this method. System 50 consists of injection-means 1, waveform-generator 2, control-circuit 3, process 4, power-source 5, and control-signals 6, 7, and 8. Process 4 is the physical process to be optimized. Injection-means 1 couples the outputs from waveform-generator 2 and power-source 5 then supplies the resulting emf to process 4. Waveform-generator 2 is a conventional waveform-generator used to develop the emf signal supplied to injection-means 1. Control-circuit 3 generates control-signal 6 to control the output of waveform-generator 2. Control-circuit 3 is conventional in implementation and can be as simple as an operational amplifier circuit or as complex as a microcontroller or full computer system. Power-source 5 is conventional and could range from the ac mains to a programmable power supply.

Control-signal 6 can be a single signal or a plurality of signals, including voltage, current, frequency, duty-cycle, and/or damping ratio, used to control the output from waveform-generator 2. Control-signal 7 can be a single signal or a plurality of signals and can be unidirectional or bidirectional. Control-signal 7 can be used by control-circuit 3 to monitor and/or control process 4 directly. Control-circuit 3 controls process 4 indirectly via waveform-generator 2, injection-means 1, and (possibly) power-source 5. Control-circuit 3 could control certain parameters of process 4, such as temperature, directly via control-signal 7. Control-signal 7 can be used as process feedback from process 4 for voltage, current, impedance temperature, pH (hydrogen-ion activity), pressure, and/or other statistical process control (SPC) parameter. Control-signal 7 is optional if system 50 is operated open-loop (without feedback from process 4). Control-signal 8 is used optionally by control-circuit 3 to monitor and/or control power-source 5. Control-signal 8 can be a single signal or a plurality of signals and can be unidirectional or bidirectional. Control-signal 8 could be used to control the output parameters of voltage, current, and frequency from power-source 5.

Figure 7:
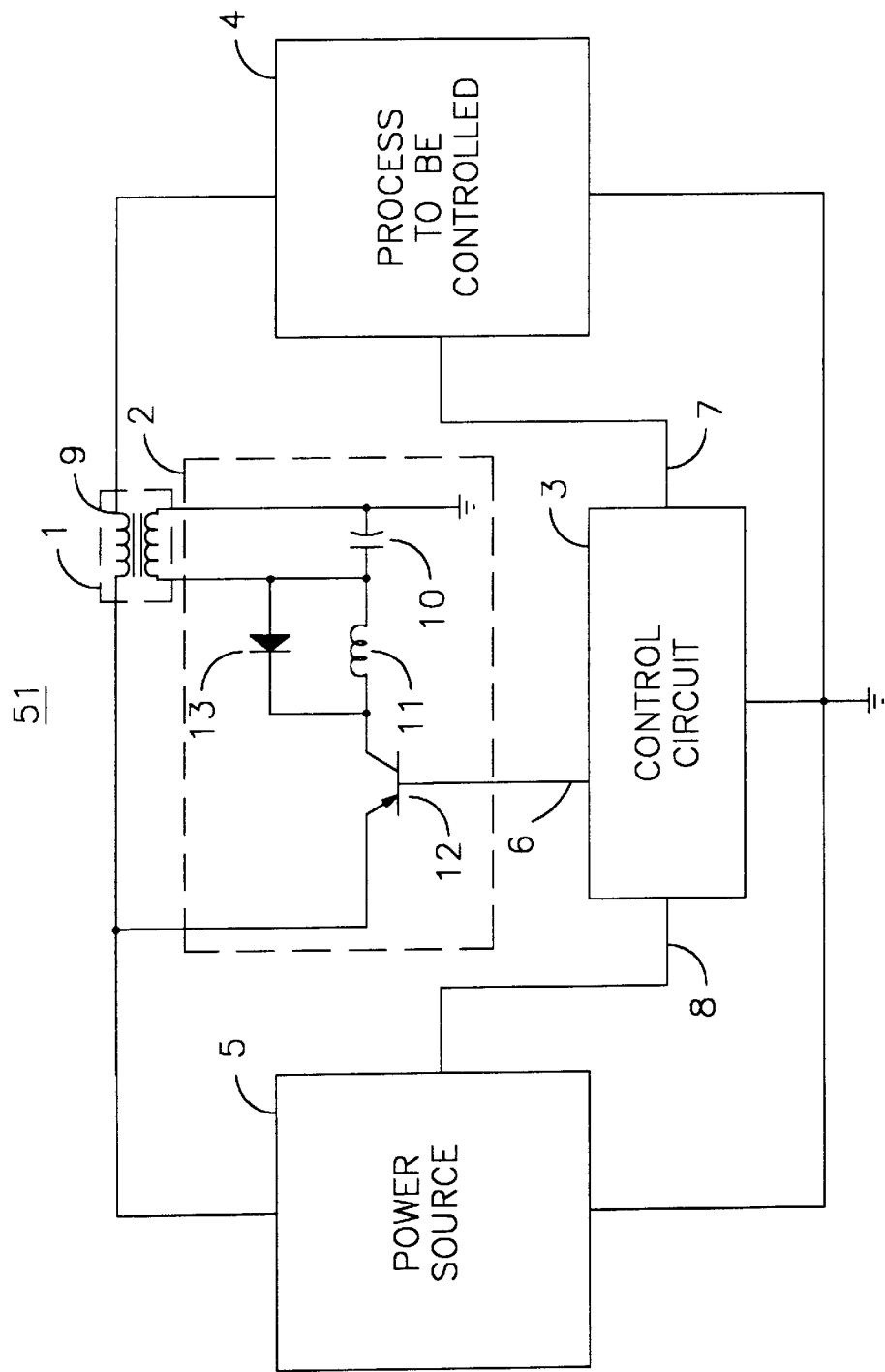
FIG. 7 is a simplified system schematic diagram of the one preferred-embodiment of this invention.

FIG. 7 is a simplified schematic diagram of system 51 derived from the block diagram in FIG. 6. System 51 consists of the same essential elements described in system 50. Control-circuit 3, process 4, power-source 5, and control-signals 6, 7, and 8 are identical in function and description to system 50. Injection-means 1 is further clarified in FIG. 7 as a coupled-inductor 9. The circuit symbol for coupled-inductor 9 is unfortunately identical to the symbol used to identify a transformer. The construction and operation of coupled-inductor 9 are very similar to a conventional transformer. For discussion purposes, the primary winding (injection winding) of coupled-inductor 9 is connected between process 4 and power-source 5 while the secondary winding is connected to waveform-generator 2. The main distinction between coupled-inductor 9 and a transformer is the importance of the inductance in the winding. The primary winding of coupled-inductor 9 must act as a current-source (inductor) to match the impedances of power-source 5 and process 4. Although not shown, an essential feature for proper operation of coupled-inductor 9 is the inclusion of a capacitor in the output of power-source 5. This capacitor completes the current path for the primary winding of coupled-inductor 9 and process 4 through system 51 ground.

Waveform-generator 2 is shown in FIG. 7 to consist of switch 12, inductor 11, capacitor 10, and diode 13. Waveform-generator 2 in system 51 is a conventional LC-tuned oscillator. Control-signal 6 activates switch 12 to initiate an oscillation cycle. Inductor 11, secondary winding of coupled-inductor 9, capacitor 10, and diode 13 form a conventional LC tank circuit used to generate the desired emf waveform. The waveform developed on capacitor 10 is applied directly to the secondary winding of coupled-inductor 9. Coupled-inductor 9 superimposes (couples) the emf waveform from the secondary winding onto the DC current supplied by power-source 5. Switch 12 is shown as a pnp transistor but can be any switch suitable for the application.

DESCRIPTION OF ALTERNATE EMBODIMENTS

Additional Embodiment Description for emf Waveforms

Figure 5A:
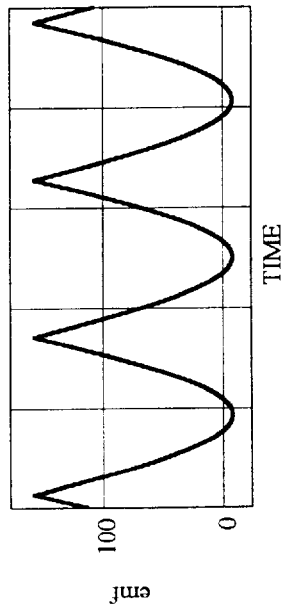
FIG. 5 illustrates two alternate waveform emf embodiments and shows both with positive and negative DC offset.
Figure 5B:
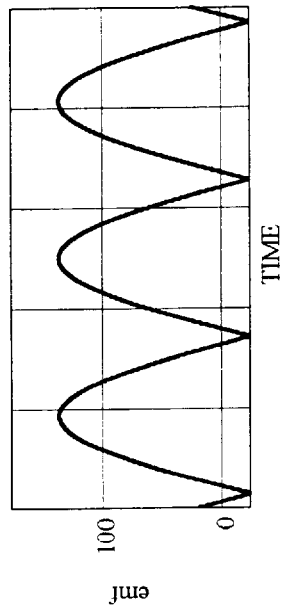

FIGS. 5A, 5B, 5C, and 5D show four different but similar emf waveforms. FIGS. 5A and 5B waveforms take the form:

f(x)=(−|(sin(x−c))|+DC offset)peak emf

FIG. 5A shows the waveform with a positive DC offset and FIG. 5B shows the waveform with a negative DC offset. The FIGS. 5C and 5D waveforms take the form:

f(x)=(|(sin(x−c))|+DC offset)peak emf

Figure 5C:
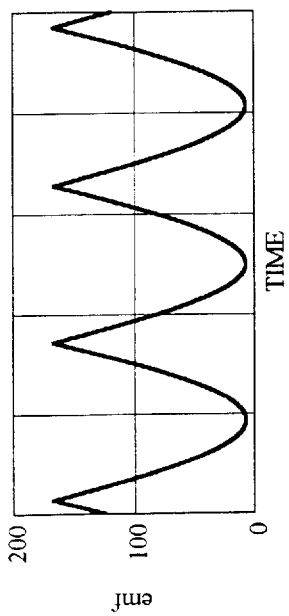
Figure 5D:
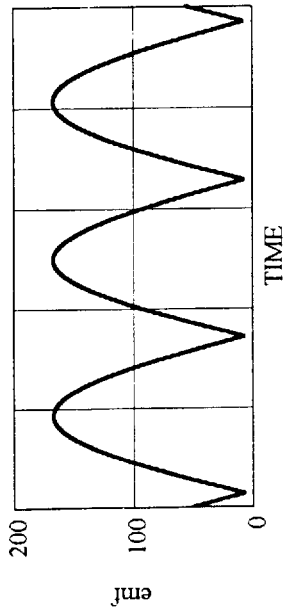

FIG. 5C shows the waveform with a positive DC offset and FIG. 5D shows the waveform with a negative DC offset. Practical implementations of this method will deviate from the ideal shapes shown.

Additional Embodiment Description for High Current emf Waveforms

Figure 18:
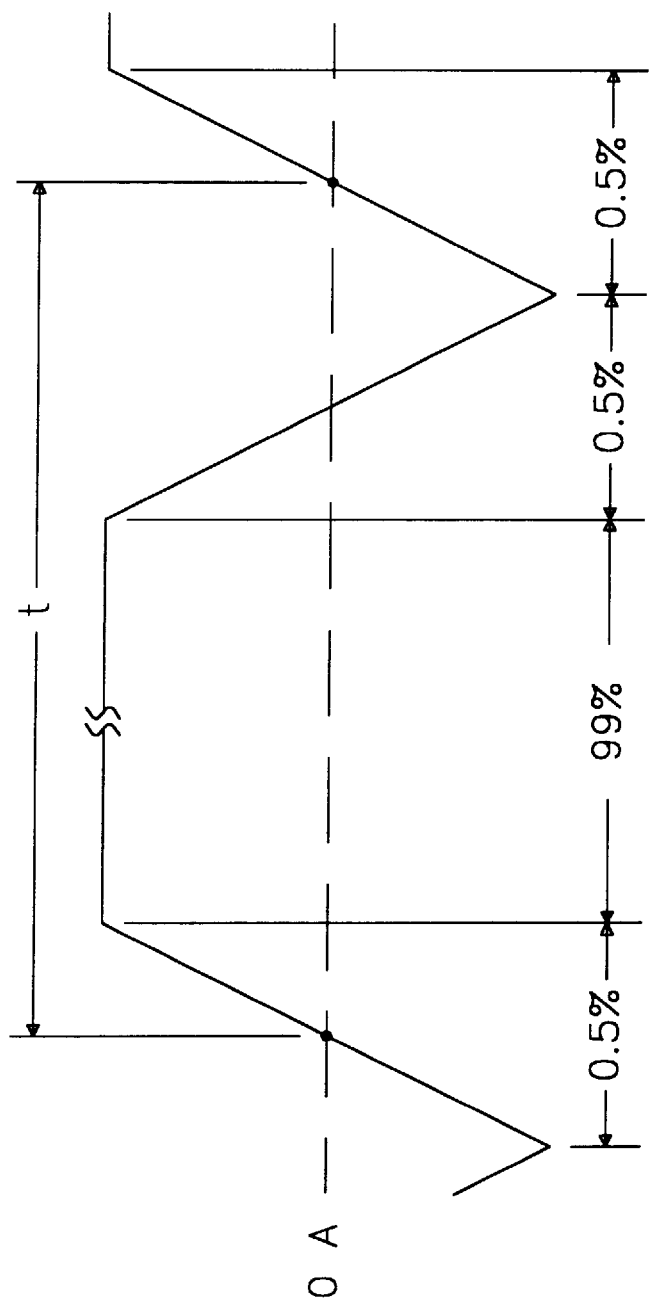
FIG. 18 gives a plot of an alternate-embodiment emf waveform for high current applications.

FIG. 18 shows an emf waveform developed from a current-source with a limited rate-of-rise. Practical implementations of this method will deviate from the ideal shape shown. This alternate waveform is a modified pulsed DC emf The current is ramped from the 0 value to a positive peak value at a rate-of-rise that matches the operational performance needed. The positive amplitude is maintained at the positive DC rate for a specified time. The current is then ramped down at a controlled rate until the negative peak is reached then the current is reversed and ramped back to the positive peak value. The percentages of time are shown as a reference and can be adjusted to match the application. Likewise, the dwell time at zero crossing is shown as zero but it could be set for a period greater than or equal to 5 time constants. The example shown is based on 50 cycles of 60 Hz ac power and the ramp time from one peak to the other peak being equal to 8.333 milliseconds.

Additional Embodiment Description for Injection-Means

Figure 10:
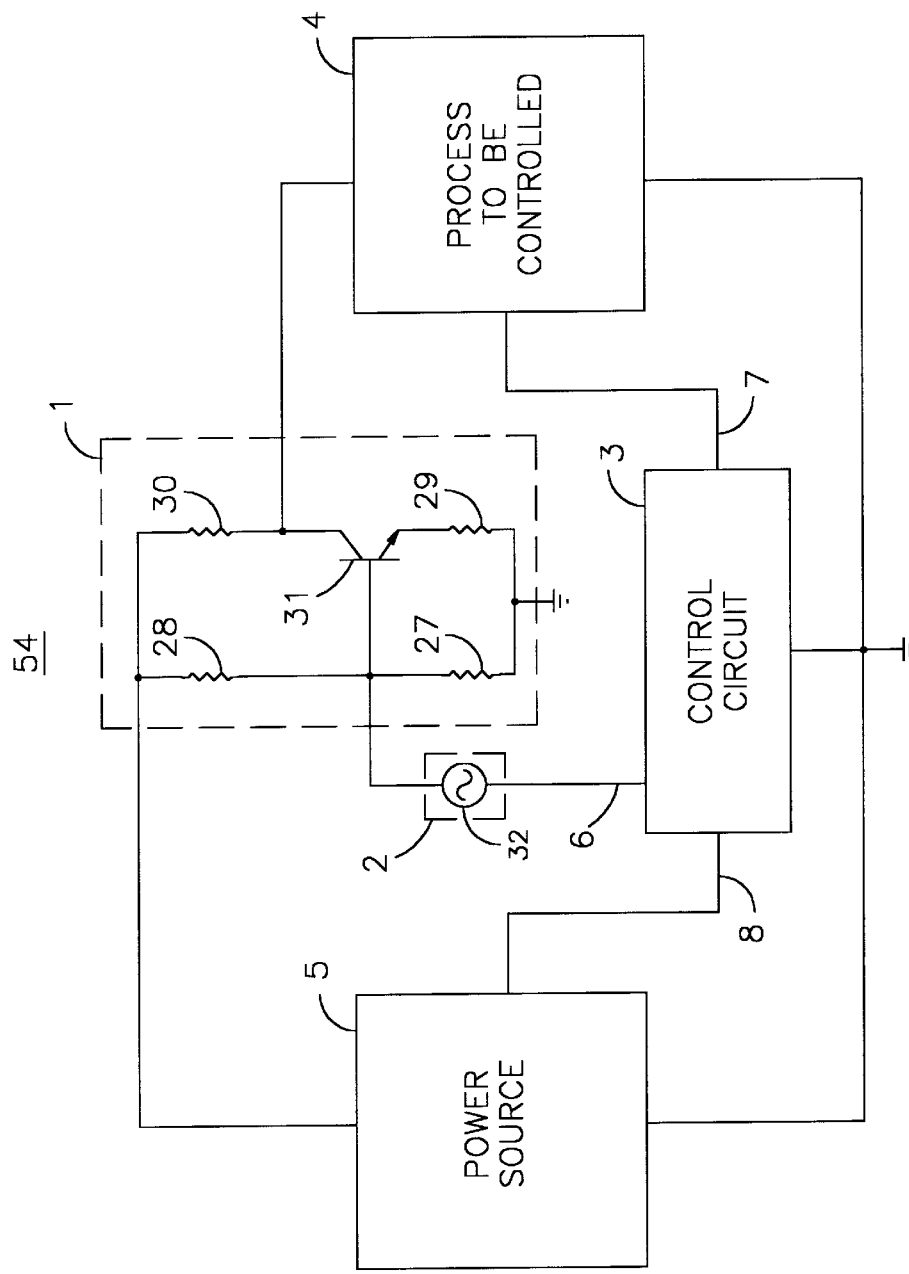
FIG. 10 is a simplified system schematic diagram of an alternate-embodiment of the invention.

FIG. 10 shows system 54 with an alternate circuit implementation for injection-means 1 and waveform-generator 2. Control-circuit 3, process 4, power-source 5, and control-signals 6, 7, and 8 are identical in description and operation as system 50. The functional operation of system 54 is identical to the descriptions given for system 50 with the exception that injection-means 1 is implemented as a conventional linear amplifier circuit and waveform-generator 2 is implemented as oscillator 32. Oscillator 32 is a conventional circuit used to generate either a sinewave, triangular, or squarewave signal. The output of oscillator 32 is supplied to switch 31. Switch 31 is shown as a npn transistor but can be any switching device suitable for the application. Although not shown, the output of oscillator 32 would normally be capacitively coupled to the base of switch 31. Resistors 27 and 28 are used to set the Q point for switch 31. Resistor 29 is an emitter resistor used to generate feedback to control the stability of switch 31. Resistor 30 is the collector resistor used to control the current for switch 31.

Additional Embodiment Description of Integral Battery Module

Figure 8:
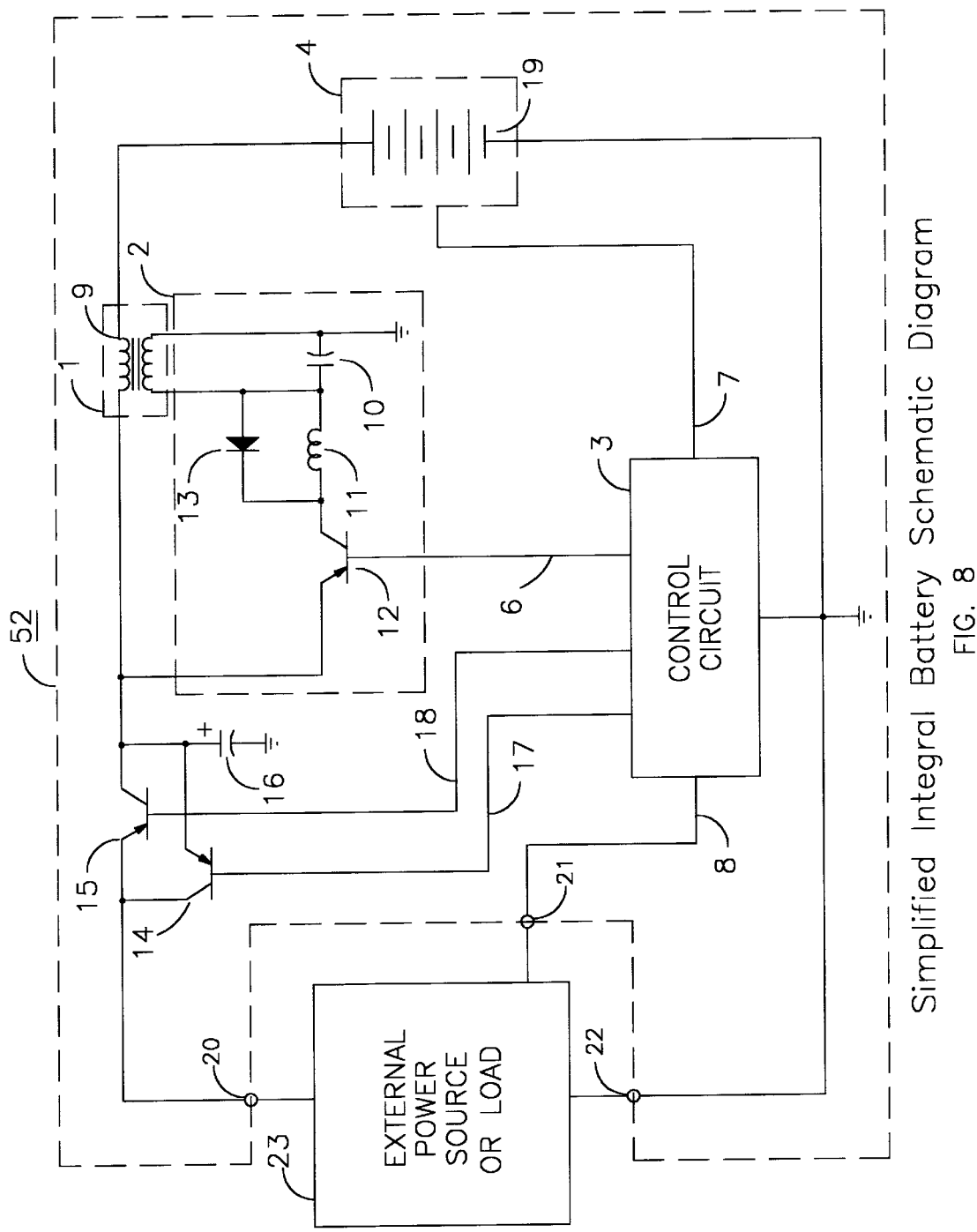
FIG. 8 is a simplified system schematic diagram illustrating a preferred alternate-embodiment.

FIG. 8 shows module 52 and external-circuit 23 that comprise the essential elements described in system 50. Module 52 consists of injection-means 1, waveform-generator 2, control-circuit 3, process 4, switches 14 and 15, capacitor 16, connections 20, 21, and 22, and control-signals 6, 7, 8, 17, and 18. Injection-means 1 and waveform-generator 2 are shown in detail for clarity and are identical in function and description as given in system 50. Process 4 is further defined as battery 19. Capacitor 16 is an essential element for the proper operation of coupled-inductor 9 with the addition of switches 14 and 15. Capacitor 16 completes the current path for the primary winding of coupled-inductor 9 and battery 19 through module 52 ground. Control-circuit 3 is identical in function as given in system 50 but in module 52 the function is better defined than the global description given in system 50. Control circuit 3 is normally implemented with a microcontroller integrated circuit. Control-signals 17 and 18 control the direction of current flow, via either switch 14 or switch 15, for external-circuit 23, coupled-inductor 9, and battery 19. Control-signal 18 is used to charge battery 19 via switch 15 and control-signal 17 is used to apply power to external-circuit 23 via switch 14. Switches 14 and 15 are shown as pnp transistors but any switch could be used that is suitable for the application. Switch 15 may also be a diode if control of charge is not desired or necessary. The collector of switch 14 and emitter of switch 15 are shown tied to connection 20 but optionally switches 14 and 15 could be wired separately to external-circuit 23. Although not shown, voltage feedback would be supplied from connection 20 and capacitor 16 to allow control circuit 3 to detect the presence of external circuit 23 and the voltage level at capacitor 16. Control-circuit 3 monitors the condition of battery 19 through control-signal 7. In module 52, control-signal 7 can be a single signal or a plurality of signals that include measurements of voltage, current, impedance, temperature, and pressure from battery 19. Control-signal 6 is identical in function and description as given in system 50. External-circuit 23 can be either an external power-source similar to power-source 5 or an external system that operates from the power developed by battery 19. Control-signal 8 is optional. Control-signal 8 can be a single signal or plurality of signals and can be unidirectional or bidirectional. Control-signal 8 may be used to control the output of external-circuit 23 when it is a programmable power-source or to communicate with external-circuit 23 if applicable. Connections 20, 21, and 22 are connection points shown to emphasize the difference in module 52 and system 51.

Additional Embodiment Description of Integral Battery Module

Figure 9:
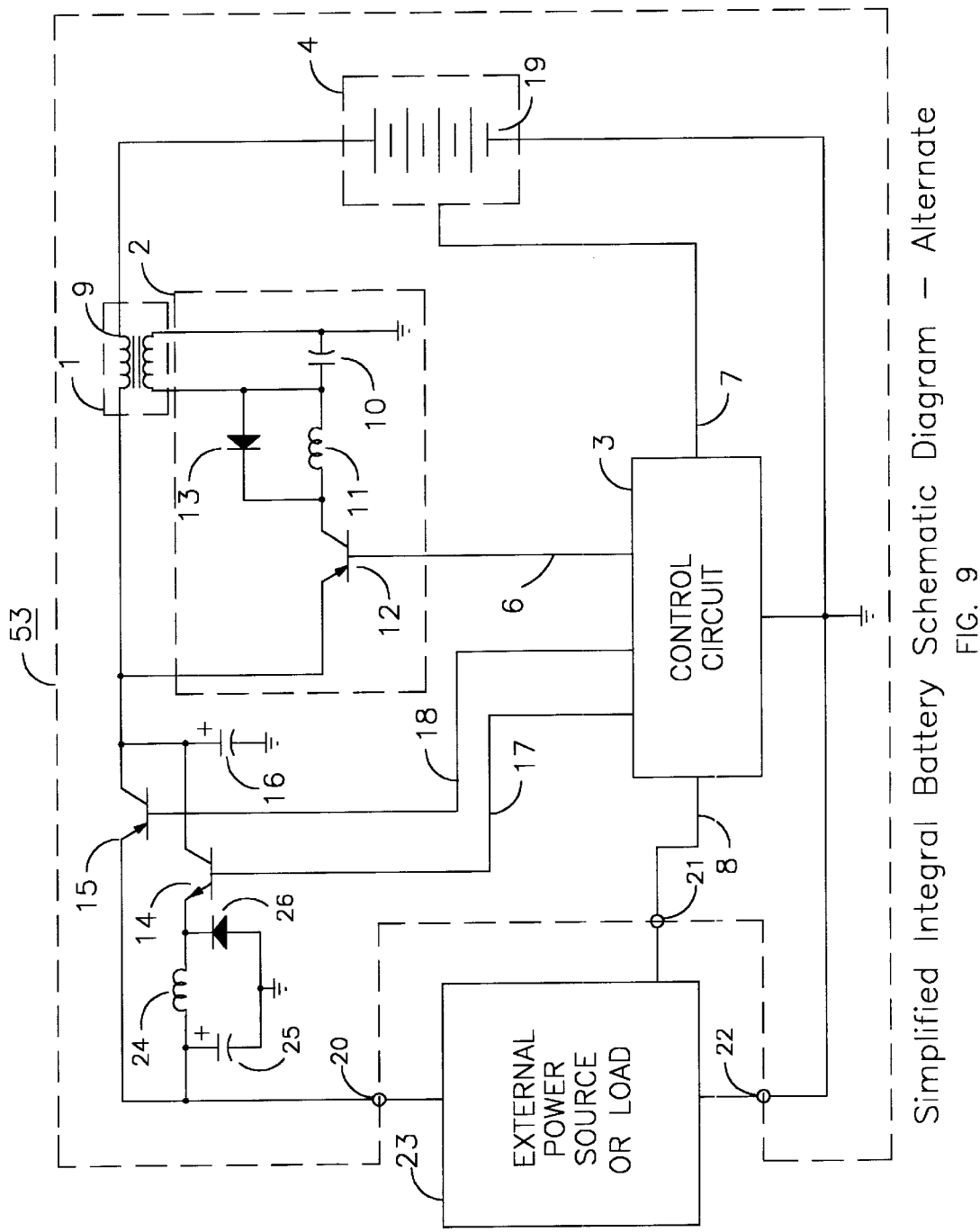
FIG. 9 is a simplified system schematic diagram of a third preferred alternate-embodiment of the invention.

FIG. 9 shows module 53 that is essentially identical to module 52 except for the addition of inductor 24, capacitor 25, and diode 26. Switch 14, inductor 24, capacitor 25, and diode 26 are configured as a switching power supply. Control-signal 17 is now a pulse-width-modulator (PWM) control-signal to control the duty-cycle of switch 14. Control-signal 8 must include the function of feedback for proper regulation of the output voltage at connection 20. Although not shown, feedback would be provided from connection 20 to control-circuit 3 with or without external-circuit 23 being connected at connections 20, 21, and 22. This configuration allows control-circuit 3 to provide a fixed or programmable output voltage at connection 20. External-circuit 23 can provide a programming signal, at connection 21, via a serial bus communication or a simple voltage or resistance setting. The configuration shown (buck) can only provide a voltage that is less than the voltage of battery 19. Alternately, the components of switch 14, inductor 24, capacitor 25, and diode 26 can be rearranged (buck/boost) to provide a voltage greater or equal to the voltage on battery 19. Switch 15's emitter is again shown connected at connection 20 but it could be wired separately. Although very difficult to implement because of the conflicting requirements, coupled-inductor 9 could also be used to form the switching power supply. Switch 14 would be connected with the emitter to coupled-inductor 9 and the collector to the positive electrode of battery 19. Diode 26 would be connected to the emitter of switch 14 and module 53 ground. Inductor 24 and capacitor 25 would be eliminated. In this configuration switch 14, coupled-inductor 9, capacitor 16, and diode 26 would form the switching power supply. Switch 15 could be a diode connected in parallel with switch 14 to allow charging current to bypass switch 14.

Theory of Operation

Physical and electrochemical systems have naturally occurring electrical characteristics that govern the efficiency and effectiveness of the particular processes involved. The characteristic of interest to this method is the electrokinetic behavior of the charged particles. Although not within the scope of this invention, the first process necessary to optimize the electrokinetic behavior of the charged particles is a thorough understanding of the process to be controlled. This understanding requires a detailed analysis of the transient response behavior, including evaluation of the transfer functions for the time-domain and the integral-transforms of Fourier and LaPlace. In a physical system where an electron is the primary charge transfer process, the analysis and measurement of the electrical characteristics are usually straightforward. In an electrochemical system, the two methods of charge transfer are ions in the solution and electrons at the electrode-electrolyte charge transfer. The electrochemical system is further complicated by the chemical reaction rate and the fact that more than one reaction can occur simultaneously. Despite major progress, much is unknown about the kinetics and thermodynamics of chemical reaction rates therefore most of the needed information has to be determined empirically.

If the forced response (caused by the emf) occurs at system resonance, the response to the stimulus will be maximum. This maximum response occurs if the stimulus (at $\omega_f$) approaches the natural response (at $\omega_n$). A system may have more than one resonant point. The charged particles can be controlled using the reactive amplification and the reactive energy drives the process more effectively than the DC or average (real) power applied. The reactive amplification at resonance is illustrated in FIG. 4. Determination of the $\omega_n$ frequency is an important first step in the process to optimize the electrokinetic behavior of the charged particles. The determination of the resonant point in a physical system is generally straightforward but it is more complicated with an electrochemical system. Other factors may dictate that the system is operated away from resonance but resonance must be understood to optimize the system performance.

If polarization losses can be distinguished with the use of ac transient responses then a posteriori the polarization can be reduced by controlling the process with ac transient response techniques. Since surface-rate reactions are very sensitive to small changes in electrical potential and overpotentials (polarization) are kinetic resistance to the reaction, the key is to avoid the generation of overpotentials. Stern proved that the rate at which ions enter the compact double layer region determines the overpotential $\psi_0$ value developed. The key to optimized reaction rates is then optimizing the flow of ions in the double layer region.

Non-reactant ions in an aqueous solution form encounter pairs that have a lifetime of $10^{-12}$ to $10^{-8}$ seconds. During this time they experience 10 to 100,000 collisions before separating from each other. Theory describes one ion as a sink and the other ion can be viewed as moving in the electric field of the stationary ion. This theory can be applied a priori to the case of an encounter of a surface and a non-reacting ion. The lifetime of the encounter (in the double layer region) is governed by the strong forces exerted by the double layer on the ion. The diameter of a hydrated ion is on the order of 1 nm, the effective thickness of the double layer region is roughly 3 to 10 nm, and the Helmholtz plane is on the order of 3 nm. If the ion transient response is determined to be limited at 10 $\mu$s, for example, a priori it takes 10 $\mu$s for ions to overcome the electrophoretic retardation and time lag associated with the double layer. The driving force should therefore be normalized to produce ion drift on the order of nanometers in an interval that maximizes the natural ion encounter lifetimes but is not faster than the ion response time. In effect, this is optimizing the ion movement to the physical parameters.

As an example, under ideal conditions the first pulse would strongly drive the ions 6 nm toward the electrode then pause to allow the ions to diffuse freely. The next pulse would pull the ions away from the electrode 2 nm then pause to allow the ions to diffuse. A 2nd less strong pulse would push the ions 4 nm toward the electrode and then pause. This would be followed by a pull that moved the ions 1 nm from the electrode followed with a pause. A $3^{rd}$ push of 2 nm and then a pause would follow. This third push would be followed by a very low intensity drive (slight push) that essentially allowed the ions to diffuse freely.

An emf that can cause this ion displacement is shown in FIG. 1. The waveform is that of a damped sinusoidal function with a DC offset. The frequency of oscillation in this example would be less than 100 kHz to match resonance and transient response times. The damped sinusoidal waveform is a waveform that occurs throughout nature. It is also the output response of an underdamped system. In FIG. 1, it can be seen that each time the emf waveform crosses the zero line, the slope of the displacement over a small period is essentially zero which corresponds to a time that the ions are free to diffuse naturally. The sinusoidal nature of the waveform will not charge the double layer capacitor. At the zero crossing point, the potential across the double layer structure is zero and then the potential is reversed. A very significant effect is that the double layer structures at the electrodes are reversed and reformed with a major perturbation of the Helmholtz region as well as the diffuse regions.

Figure 25:
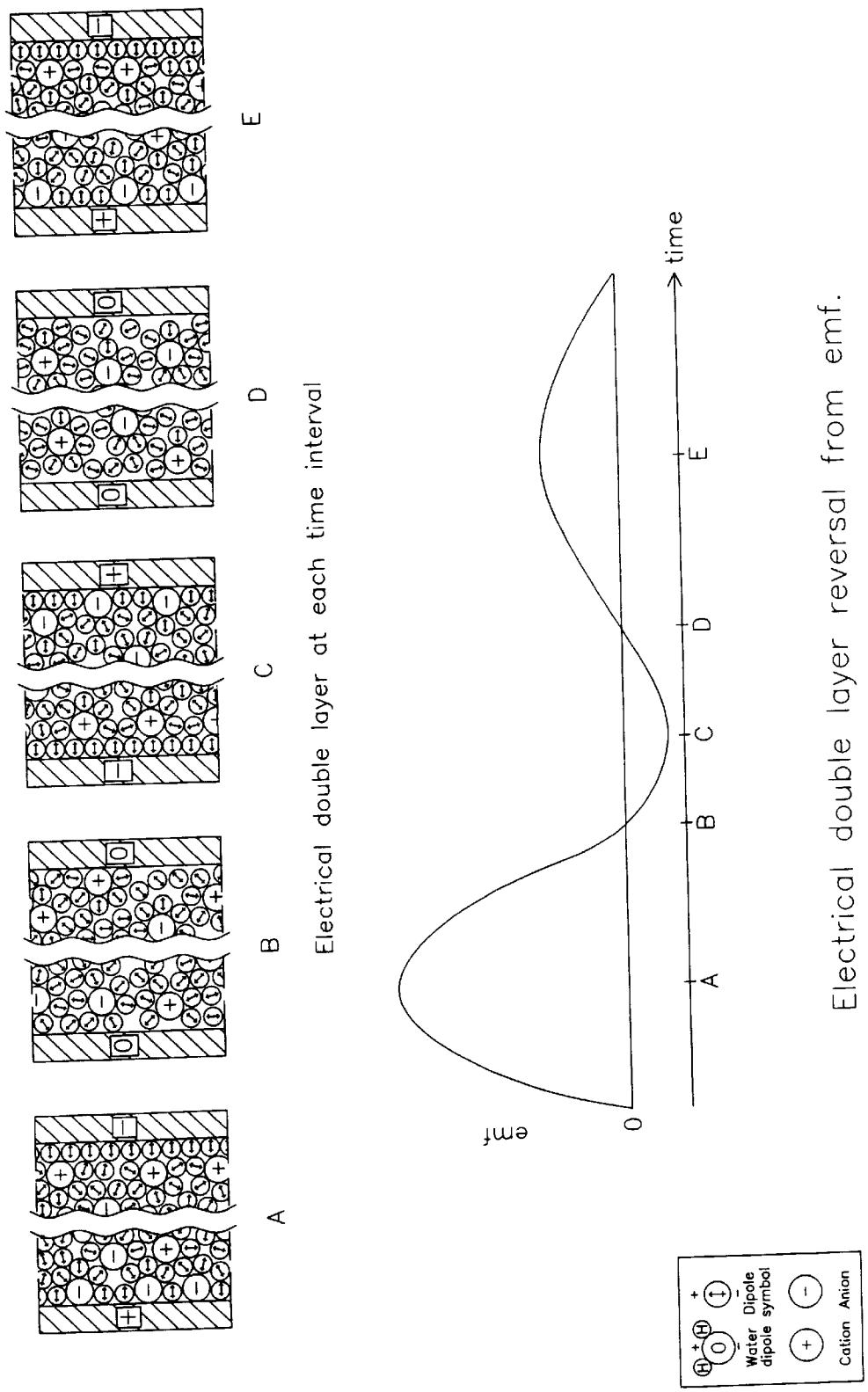
FIG. 25 illustrates the effect of the preferred-embodiment waveform on the electrical double layer capacitor.

FIG. 25 illustrates the effect of the emf on the double layer structure. In FIG. 25, five time intervals are illustrated. At time interval A the inner Helmholtz plane (IHP) at both electrodes is well ordered and the cell is in a galvanic mode. Time interval B shows that the potential across the electrodes is zero and the IHP is disrupted. The ions are released from the force of the IHP and free to diffuse. The water dipoles are reoriented by the ions. At time interval C the cell is in an electrolytic mode and the IHP at each electrode is again well-ordered but in a reverse direction. Time interval D again shows the potential at zero and the IHP disrupted. In time interval E, the cell is back in the galvanic mode and the IHP at each electrode is well-ordered but reversed for a second time.

The first law of kinetics describes how the overpotential n, varies exponentially with the current density. Therefore, the waveform $n_s$ usually rises or decays exponentially. The damped sinusoidal waveform also follows an exponential rise or decay so the emf exponential shape follows the natural response of the system. Ions are delivered and allowed to diffuse naturally so the effective concentration is maximized and $n_c$ is minimized. The current density is directly proportional to the exchange current as represented in the Tafel equation. The exchange current is a measure of the freedom from kinetic limitations. A large value of exchange current means the reaction will proceed with a low overpotential at high current density. Optimizing the kinetics at the interface therefore effectively lowers $n_s$. If the frequency of oscillation approaches the natural resonance of the ion drift and double layer structure the reaction rate will be maximized and the parasitic elements minimized.

The DC offset shown in FIG. 1 is the normal DC emf that would be used to drive the system in prior art inventions. The reactive power allows a more effective force without an increase in the average or DC energy supplied to the system.

Figure 16:
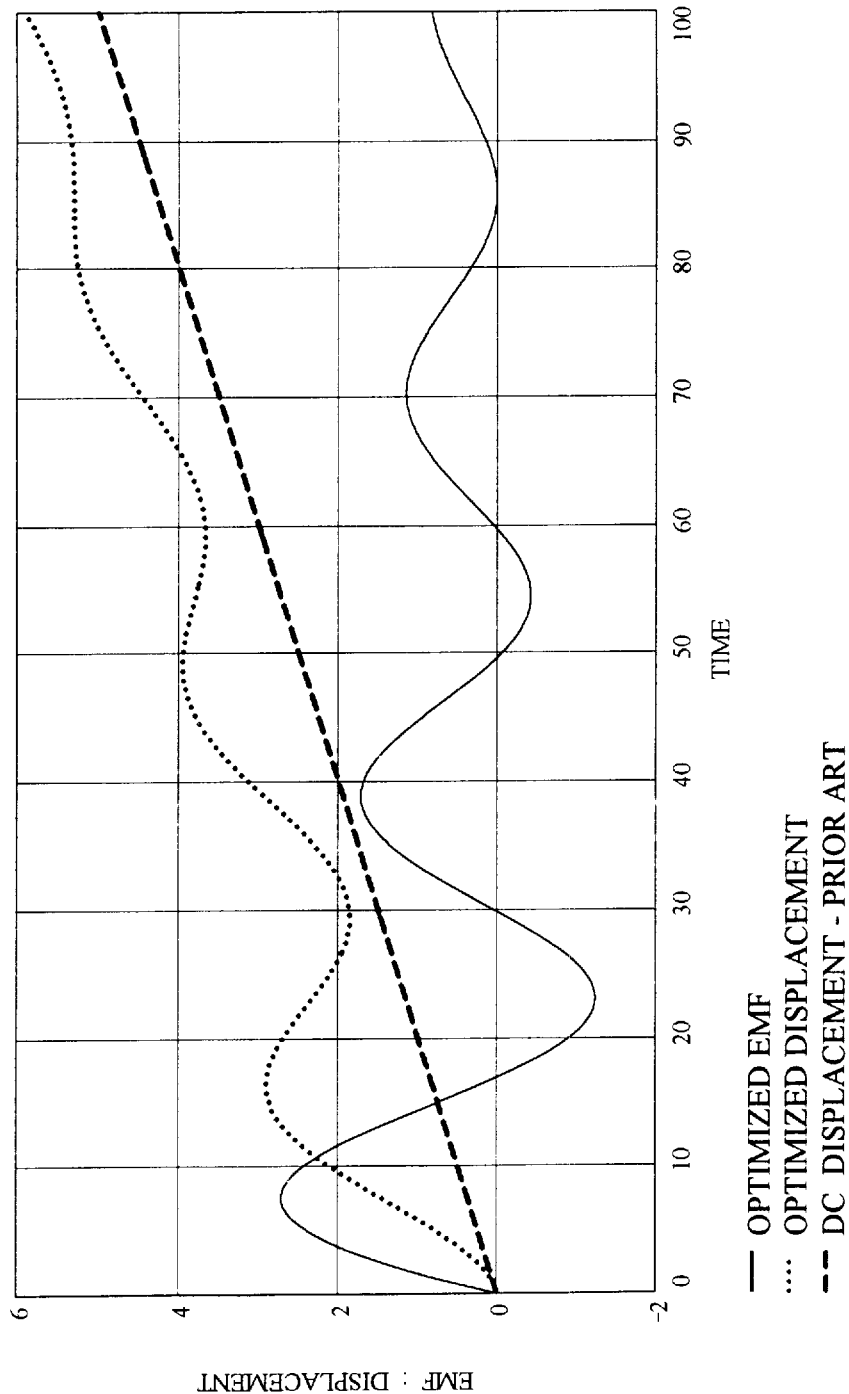
FIG. 16 is a comparative plot of the preferred waveform and resulting displacement versus the displacement from an equivalent DC electromotive force.

FIG. 16 depicts the displacement with the new method versus the equivalent DC current. The damped sinusoidal waveform shown completes three oscillations each cycle with 5 direction changes and 5 diffusion periods. The first peak in the example is nearly 5 times the amplitude of the DC value and results in a large initial displacement that is equal to one-half of the total displacement each cycle. The displacement resulting from the DC does not reach the same value until roughly 60% of the cycle is completed. The last diffusion period lasts roughly 20% of the cycle. The net straight-line displacement from the equivalent DC is only 80% of the displacement from the damped sinusoidal waveform over the same period.

With a one second DC pulse applied as described in prior art, the ions would be driven steady toward the electrode without a depolarization pulse for 33,333 cycles of the damped sinusoidal emf shown in FIG. 1. In those 33,333 cycles there would be 166,665 ion direction changes and diffusion periods. Each ion direction change also results in a reversal and reformation of the double layer structure at each electrode. The very long duration DC emf contributes to overpotentials and poor distribution of ions and can actually slow the reaction rate. The long duration DC emf essentially has the opposite effect of mechanical stirring. A depolarization pulse width of 5 ms is still roughly 167 times the cycle time in this example.

FIG. 24B shows the dynamic nature of an electrochemical cell to contrast the static view depicted in FIG. 24A. The electrochemical cell is in a constant state of change. Many factors affect the cell and include current, voltage, temperature, state-of-charge, and previous operating conditions. Even with DC operation, the cell is constantly changing and should be viewed as a dynamic system.

Figure 17:
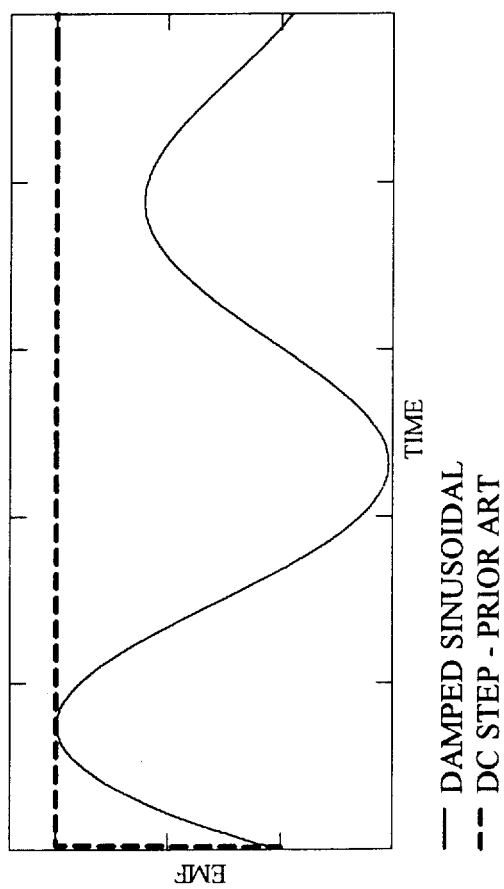
FIG. 17 is a comparative plot of the preferred waveform versus the pulsed DC (step function) waveform described in prior art illustrating the energy loss resulting from DC.

A comparison of a damped sinusoidal waveform and a DC step function is shown in FIG. 17. The comparison is intended to quantify the other parasitic losses associated with DC versus the sinusoidal waveform. For comparison purposes, the peak amplitude of the initial pulse is equal to the DC unit value. Since the electrochemical system cannot respond to the rate-of-rise of the DC step, the result is energy loss and system heating. Obviously, the DC rate-of-rise in a practical system will be finite. If the leading edge of the sinusoidal pulse is optimized to the natural response of the system, as intended, then the area between the two curves, from t=0 to the first sinusoidal peak, will represent the DC loss. This area is generated by the high frequency harmonics required to produce the DC waveform. The area represents 32.9% of the total DC energy applied over that period. This example also explains how matching the rate-of-rise of a DC pulse to a process can reduce the DC losses.

Nernst explained that the limiting current density would be much greater with vigorous stirring than without stirring. Many electrochemical systems operate under mass-transport control since mechanical stirring is not practical. Many industrial processes operate under mass-transport control even with mechanical stirring. With or without stirring, the waveform depicted in FIG. 1 will result in a perturbation of the ions. This mass-transport perturbation will be perpendicular to the electrodes since the ions are pushed and pulled between the electrodes by the emf. FIG. 22A illustrates one method, of prior art, to provide mass-transport perturbation using a flow channel. Other methods exist for mechanical stirring with various resulting flow patterns. One common factor is that the stirred solution develops a laminar flow over the electrodes that is parallel with the plane of the electrodes. The resulting flow-velocity distribution is shown in FIG. 22A. The velocity of the flow approaches zero at the surfaces. The concentration of reactants is greatest at the leading edge of the electrode and lowest at the trailing edge, such that, the reaction rate is greatest at the leading edge and decreases across the electrode surface. FIG. 22B shows the relative advantage of the perpendicular electromotive mass-transport perturbation created by this method. The electromotive perturbation combined with mechanical stirring will improve the concentration distribution across the surface of the electrodes. Many industrial processes are operated at or near the limiting current density for maximum throughput, since the limiting current density will increase with the perpendicular perturbation, the throughput will increase.

The use of higher C-rate charging improves the charge acceptance of batteries because the ions penetrate deeper into the electrode. One reason for the improvement in penetration is that the higher current forces the current to spread out over a larger surface. The spreading is caused by the gradient of conductivities on the surface. When a high current density is passed through a low conductivity area, the resistance increases so that some current then flows to other areas. At low current density, the current flow pattern can be more concentrated in a small area. At higher current densities, the ions cannot all react on or near the surface so more of the ions are pushed into the interior.

Deep penetration of ions into the electrodes also minimizes the problem of inactive materials and morphological changes in the crystal structure. A primary cause of self-discharge in a battery is the morphological structural change in the crystal structure. If a battery is subjected to a waveform as depicted in FIG. 1, but with zero DC offset, during inactive periods a priori the self-discharge process will be reduced.

If a battery is charged with the waveform (peak 5× DC offset) depicted in FIG. 1 and the DC current offset is set at the 1C-rate, a priori the charge acceptance will be increased to roughly the 5C-rate without the other side effects of 5C-rate DC charging.

If a battery is discharged with the waveform (peak 5× DC offset) depicted in FIG. 1 superimposed on the DC current, the exchange current will be increased and the kinetic resistance will be decreased a priori the discharge performance can be improved.

The energy-density in a battery is a function of the total mass of active material and effective surface area of the electrodes. The peak current density is a function of the surface area at the interface of the electrodes. The physical construction of a battery is a compromise between thick electrodes (large mass) and interfacial surface area. If both modes of electrolytic and galvanic operation were controlled in a battery by a process, with the waveform (peak 5× DC offset) depicted in FIG. 1 superimposed on the DC current, a priori thicker electrodes could be used to increase energy-density yet maintain the peak current capability.

The drift velocity that an ion can achieve is based on the ionic mobility of the ion and the force applied. The ionic mobility of the hydrogen ion $H^+$ is roughly 4.5 to 8 times faster than a typical metal ion and the hydroxide ion $OH^-$ is about 3 to 5 times faster. Hydrogen gas evolution is often a product of a parasitic side reaction caused by inefficient charging and discharging. The hydrogen generated at one electrode often migrates to the other electrode and causes permanent damage to the active materials. Also, the build-up of hydrogen gas also increases the pressure in a cell and can lead to permanent damage. These factors emphasize the importance of avoiding parasitic side reactions and the importance of understanding the operation parameters of the system.

In an electrical RLC circuit, a log-log plot of impedance versus frequency would yield a plot with −45° slope (−20 dB/decade) approaching the minimum impedance point at resonance $\omega_n$, a cusp at $\omega_n$, and a +45° slope (+20 dB/decade) after the resonant point. The phase would be −90° until the point 0.1 $\omega_n$, then the phase would ramp up at 90° per decade ($2^{nd}$ order system) before leveling off at +90° at 10 $\omega_n$. With an electrochemical (battery) system, the initial slope is very gradual and is followed by a very wide, nearly zero slope plateau that extends for 3 to 5 decades before increasing. FIG. 21 shows an impedance plot for three different AA size batteries. A measurable $\omega_n$ point occurs where the impedance is minimum but the expected phase shift at 0.1 $\omega_n$ does not occur. A phase shift does occur one decade before the impedance begins to increase rapidly. In FIG. 21 it can be seen that the impedance begins to increase rapidly at roughly 100 kHz. Although not shown, the phase shift occurs at roughly 10 kHz and only rises at roughly 45° per decade. The phase and impedance relationships indicate a complex, multiple order system with multiple resonance points.

The electrochemical system can maintain a relatively flat response over a very wide frequency span. The only means of maintaining a flat response is for the reactive components to change in value as the frequency increases. Experimentation confirms that the capacitance decreases with increasing frequency below $\omega_n$. This means that the cell is effective until the ion transport or reaction is no longer able to respond to external demands. The electrochemical system has a critically damped response to a stimulus based on the time-domain transient response measurements. The voltage rises and falls to external loads with an exponential response.

The cause and effect of a distinct electrical $\omega_n$ and the existence of a second, higher frequency, resonance point is unclear. The second resonance point could be a chemical resonant point caused by the ion transient time or by another kinetic limitation. Early experimentation revealed that operating above the electrical resonant point increased the heat generated in a cell. Remember that the process applies a forcing function to the system and operating with too high a frequency or amplitude will result in the same problems as DC emf. An increase in either heating or overpotential indicates that the emf is not optimally matched to the process.

Charge acceptance decreases with increasing temperature and/or overpotentials. Thus, the generation of heating and overpotentials provides external parameters for process control of charge acceptance. If active control, with feedback, is used on an electrochemical process, the peak current, DC offset, and frequency of the charge waveform can be matched to the changing conditions in the cell to maximize the charge acceptance.

Experimentation has revealed a relationship between $\omega_n$ and the thickness of the electrodes. The relationship is counterintuitive to the initial expectations that thin electrodes (high interfacial surface area) would mean that $\omega_n$ would occur at higher frequency (than thicker electrodes) because of the shorter distances involved. It now appears that thick porous electrodes mean higher frequency $\omega_n$ values. A priori the greater the effective surface area the higher the operating frequency. The $\omega_n$ varies significantly with the physical and geometric properties of a system. For example, a NiCd C cell will have a different $\omega_n$ value than the same chemistry AA cell.

In an electrical RLC circuit, the resistance value will determine the damping ratio. A very low value of R will yield an underdamped system and a very large value will result in an overdamped system. The same relationship holds for the electrochemical system. When a forcing function, such as the waveform depicted in FIG. 1, is superimposed on an electrochemical system, the response to the stimulus will depend on the value of R. If the cell impedance is low then the response will be underdamped. In this way, the process in this system is naturally damped by the effective resistance of the electrochemical system. For example, if the impedance of a deeply discharged battery is initially high then the peak current values will be naturally damped (reduced). As the charge level increases and the effective resistance decreases, the peak current will increase. This natural damping effect can be seen in FIG. 4.

Operation of Invention—Preferred Embodiment

For clarity and except as noted, the description that follows is limited to the application of an electrochemical process. FIG. 1 shows an electromotive force (emf) capable of causing optimized charged particle electrokinetic movement or displacement in an electrochemical system. The initial peak of the emf causes a displacement in time of the ions toward one electrode. As the positive peak approaches the zero-crossing point the slope of the ion displacement is essentially zero. When the slope of the displacement is essentially zero, the ions are free to diffuse without the influence of the emf. As the emf waveform continues negatively, the ions are pulled away from the electrode. As the waveform again approaches zero, the ions are again allowed to diffuse freely. Because of the damped nature of the emf, each cycle of oscillation has a decreasing displacement, positive and negative, in time. The frequency of oscillation for the emf is selected to match closely the system's natural resonance frequency. The displacement in time of the ions can be further controlled by changing the peak emf amplitude and the DC offset. The displacement in time should be optimized to match the natural physical structure of the system and here that structure is the electrical double layer that forms at the solid-solution interfaces. The goal is to optimize or normalize the ion's electrokinetic behavior (movement) to the process, in this case cause a displacement of nanometers per time. Operating at or near system resonance allows the use of reactive energy or amplification to improve the system response without increasing the applied average or DC energy.

FIGS. 2A and 2B show the effect of DC offset on the emf and resulting displacement. The DC offset affects more than the net displacement in time. If no DC offset is applied, the ions will receive greater positive and negative perturbation (displacement) in time but with a small net positive displacement, as shown in FIG. 2A. If the DC offset is set greater than the value shown in FIG. 2B, the net displacement will be greater but the positive and negative perturbation of the ions will be further reduced and also the time and frequency of the diffusion periods will be reduced. Increasing the DC too much has an adverse effect on the perturbation of the ions, assuming that the peak amplitude remains constant.

The effect of frequency-of-oscillation is shown in FIGS. 3A and 3B. FIGS. 3A and 3B are plotted on the same time base and FIG. 3B is allowed to continue to oscillate over the total time. With the same peak current and DC offset, increasing the frequency of oscillation reduces the ion displacement over the same time. FIG. 3B does illustrate that after the third cycle, at time=50, the ion displacement is essentially constant per unit of time. This result further illustrates the effect of increasing the DC offset, discussed above.

FIG. 4 shows three different ac peak amplitudes for the emf. Adjusting the peak amplitude will result in more useful oscillation cycles being developed, as seen in FIG. 4. The adjective 'useful' is used to relate the number of negative displacements per cycle to the desired ion perturbation. In FIG. 3B, the peak amplitude and DC offset resulted in about three useful oscillation cycles. Increasing the peak amplitude in FIG. 3B would result in more useful oscillations and greater ion perturbation.

FIG. 4 also illustrates the concept of reactive energy or amplification at resonance. The closer the frequency of the emf is to the natural resonance of the system, the greater the response of the system. FIG. 4 also shows how the system's impedance can control the emf. If the system impedance is high at the beginning of the process, this impedance will damp the response to the emf and the peak current will be reduced. As the process proceeds and the impedance decreases, the response will increase.

FIG. 6 is a system block diagram of the essential elements needed to implement this method. As applied to an electrochemical system, system 50 controls the reaction rate of process 4. Injection-means 1 superimposes (injects) the emf waveform generated by waveform-generator 2 on the DC offset current generated by power-source 5. Control-circuit 3 monitors process 4 and adjusts the emf waveform and DC offset current to optimize the electrochemical process. Control-circuit 3 can optionally monitor the process parameters of process 4, including voltage, current, impedance, temperature, pressure, pH (hydrogen-ion activity), and/or other statistical process control (SPC) parameters. Changes in the impedance of process 4 automatically adjust the peak amplitude of the emf Control-circuit 3 could override the damping factor separately from process 4 thus increasing or decreasing the peak amplitude of the emf. Control-circuit 3 can effectively control the reaction rate of process 4 by controlling the emf characteristics, which include voltage, current, frequency, duty-cycle, and damping ratio. Control-circuit 3 also can control how many damped oscillations are allowed per cycle. The number of damped oscillations can range from a one cycle to a practical limit of maybe 10. Control-circuit 3 can optionally control the output parameters of power-source 5, including voltage, current, and frequency. Remember that injection-means 1 is coupling a forcing function $\omega_f$ onto the DC offset that can be independent of the natural resonance $\omega_n$.

FIG. 7 shows one preferred-embodiment, system 51, for applying the emf waveform in this method. System 51 deviates from the global operation of system 50 by the implementation of injection-means 1. Injection-means 1 is implemented as coupled-inductor 9. Coupled-inductor 9 superimposes the emf signal, from waveform-generator 2, on the DC current from power-source 5. An important design characteristic of coupled-inductor 9 is the turns ratio of the primary and secondary windings. The turns ratio determines the relative amplitude of the coupled emf from the secondary to the primary winding. A very important and less obvious parameter is the coupling coefficient. Tightly coupled windings result in a high coupling coefficient and loosely coupled windings result in a low coupling coefficient. If the coupling coefficient of coupled-inductor 9 is high then the emf will be injected in phase with the primary current. With a low coupling coefficient, energy will be stored in the core and a time delay (phase lag) will occur before the energy is delivered to the primary. The significance of these two conditions is that the mode of coupling determines the impact of the emf on process 4. With tight coupling in coupled-inductor 9, process 4 will be forced to oscillate in phase with the emf generated in waveform-generator 2. With loose coupling, the stored energy in the core allows the emf generated to oscillate with (the load) process 4. This coupling technique allows this method to be applied to many different systems. If process 4 were an electroluminescent system, the highly capacitive system would be matched to a coupled-inductor 9 with a low coupling coefficient. If process 4 were a battery, the low impedance battery would be matched to a coupled-inductor 9 with a high coupling coefficient. The coupling coefficient allows the emf to be matched to low and high impedance loads. FIGS. 5A, 5B, 5C, and 5D are typical of the voltage emf that results with a high impedance or reactive load and a low coupling coefficient. FIGS. 1, 2A, 2B, 3A, 3B, and 4 are typical of the current emf that results with low impedance loads and high coupling coefficients.

Caution should be observed with the simple LC tank circuitry, shown as waveform-generator 2 on FIG. 7, when setting the number of damped oscillations per cycle. Switch 12 applies a certain amount of energy to the circuit to initiate the oscillations. Attempting to start a new cycle before the energy is dissipated can result in saturation of inductor 11 and other problems. A practical limit is no less than 2 damped oscillation cycles with the simple circuitry shown.

OPERATION OF ALTERNATE EMBODIMENTS

Operation of Alternate Embodiment High Current emf Waveform

FIG. 18 shows an emf waveform suitable for very high current applications that exceed the current capability of injection-means 1 implemented with coupled-inductor 9. Many electrochemical processes operate at very high currents that could benefit from higher efficiency and ion perturbation, as depicted in FIGS. 22A and 22B. FIG. 18 illustrates a pulsed DC emf with limited rate-of-rise and this waveform is therefore developed by a current-source with a limited rate-of-rise. FIG. 18 is compatible with system 50, as shown in FIG. 6. Waveform-generator 2 and control-signal 6 would be eliminated. Control-circuit 3, in system 50, initiates power-source 5 to begin a cycle at zero current. Injection-means 1 (inductor or current-source) controls the rate-of-rise of the emf current applied to process 4. Injection-means 1 limits the rate-of-rise to a practical value that minimizes the DC energy loss. Process 4 is driven by the DC emf for a period that matches the application and then control-circuit 3 initiates a negative current cycle by turning-off the positive current output of power-source 5. At the zero-crossing point, control-circuit 3 could initiate a wait period of greater than 5 time constants or initiate the negative current output of power-source 5. When initiated the current will then continue to ramp to the negative peak. At the negative peak, control-circuit 3 turns-off the negative current output of power-source 5 and then current begins to ramp to zero. At the zero-crossing point, control-circuit 3 will start the next positive DC cycle.

This high current emf embodiment could also be implemented in a low-cost, low-current configuration. This low-cost implementation could be used when acquisition costs are more important than the operational benefits and energy-savings derived from the preferred-embodiment of system 50 implemented with the emf waveform depicted in FIG. 1.

Operation of Alternate Embodiment Integral Battery Module

FIG. 8 shows a practical application of system 51 in the form of module 52. The operation of module 52 is essentially identical to system 51 with the inclusion of external-circuit 23. In this implementation, module 52 is intended as an integration of battery 19, control-circuit 3, waveform-generator 2, coupled-inductor 9, and switches 14 and 15 into a single package. The preferred-embodiment of module 52 is the packaging of control-circuit 3, waveform-generator 2, coupled-inductor 9, and switches 14 and 15 into an assembly that is roughly the size of a single cell of battery 19. The resulting assembly and battery 19 would then be packaged together as an integral battery assembly, module 52. Control-circuit 3 is typically a microcontroller circuit that regulates all aspects of the charge and discharge of battery 19. Switches 14 and 15 can be used to protect battery 19 from external short-circuits and overcharge currents. Switch 15 controls the charge current being applied to battery 19 by a power-source at external-circuit 23. Switch 15 could be implemented to operate in the linear mode or as a current-source to regulate the DC current supplied to battery 19. If switch 15 is operated in this mode then the power supply in external-circuit 23 can be a very low-cost, unregulated supply. Module 52 eliminates the need for an external battery charger and lowers the overall system cost. Switch 14 is used to control the discharge current drawn from battery 19. Switch 14 can terminate the discharge of battery 19 to ensure a temperature-compensated safe depth-of-discharge as determined by control-circuit 3. Coupled-inductor 9 will continue to inject battery 19 with the emf waveform, no dc offset, when switches 14 and 15 are both turned-off. The current path is through capacitor 16, coupled-inductor 9, battery 19 and module 52 ground. The emf pulses, with no DC offset, are applied to battery 19 to minimize the amount of inactive material and reduce memory and self-discharge effects. The repetition rate of the pulses is determined by control-circuit 3 based on battery 19 usage (history) and ambient temperature. Switches 14 and 15 are connected at connection 20 but could easily be connected to individual connections points for separate connection to external-circuit 23. Typical feedback signals, from battery 19, supplied by control-signal 7 would be battery-voltage, battery-center-tap voltage, and battery-temperature. The battery-center-tap voltage can be used to monitor imbalances in individual cells. Control-circuit 3 can optionally communicate with external-circuit 23 via control-signal 8. The communication may be as simple as logic level status signals, such as, enable and status. The communication could be via a serial bus that transmits battery 19's state-of-charge data to a host system that is operating from the power supplied by module 52. Additionally, a user could signal control-circuit 3, via control-signal 8, to override the safe depth-of-discharge protection. Control-circuit 3 would also record battery 19 usage and this data could be used to determine warranty issues. This information could be retrieved via control-signal 8 if the proper codes are supplied by (the host) external-circuit 23.

Operation of Alternate Embodiment Integral Battery Module

FIG. 9 shows module 53 as a further extension of the lower-cost and smaller module 52. The major distinction between module 52 and module 53 is the inclusion of a regulated power supply in the output of module 53. The power supply can optionally be programmable. Switch 14, inductor 24, capacitor 25, and diode 26 form a regulated power supply, shown in the buck configuration. The components could also be arranged in a buck-boost arrangement if a voltage higher than the voltage of battery 19 is needed. Switch 14 could also be implemented as a low-cost linear regulator power supply and inductor 24 and diode 26 could be eliminated. Module 53 could eliminate the need for the internal power supply typical of the host system located in external-circuit 23.

CONCLUSION, RAMIFICATION, AND SCOPE OF INVENTION

Accordingly, the reader will see that I have provided an electronic method whereby the applied electromotive force optimizes the electrokinetic behavior of charged particles to match closely the natural electrical response and physical structure of the system. In electrochemical systems, this method resulted in faster rates of reaction, higher efficiency, reduction of parasitic side reactions, improved mass-transport perturbation, tighter process control, improved uniformity of electroplating or deposition, lower energy and system costs, better utilization of materials, and increase process throughput. This method will allow further system or process improvements that can better utilize the benefits of the optimized emf, such as thicker electrodes. This method has benefits that extend to safety, environmental, and economic issues well beyond the scope of the electrokinetic behavior of the systems.

The injection technique described in this method allows this process to be applied to a very broad base of physical and electrochemical systems beyond the examples discussed. As an example, this method has been experimentally applied to other electrolysis processes and the use of this method in many industrial processes is contemplated. This method can be applied immediately to processes such as the in-situ electrokinetic remediation of contaminated soils, electrophoresis, electrodecantation, electroplating, electrodissolution, electrodialysis, electrodischarge or electrolytic machining, electrorefining, electropolishing, electroforming, electroextraction, electrostatic precipitation, electroendosmosis, electrocapillarity, electrostatic separation, and the formation of new batteries. Although not yet explored, the types of charged particles contemplated extends beyond molecules, ions, and electrons to include biological systems.

While the above description gives many example uses or contemplated uses for this method, these should not be construed as limitations on the scope of the invention but rather as an exemplification of the preferred-embodiments thereof. Accordingly, the scope of the invention should not be determined by the embodiments illustrated but by the appended claims and their legal equivalents.

I claim:

1. In a physical process, an improved method for controlling electrokinetic behavior of charged particles that comprises the following:

waveform generating means to produce a waveform of predetermined amplitude, frequency, waveshape, damping factor, and duty cycle;

power source means for producing sufficient energy;

injection means to combine said waveform with said energy to produce an electromotive force;

applying said electromotive force to said process;

control means to repeat above steps until a preselected parameter is achieved;

whereby said electrokinetic behavior of said charged particles is substantially matched to said process' natural electrical response and physical characteristics.

2. The method of claim 1 wherein said electromotive force is substantially characterized as a damped sinusoidal waveform of at least one oscillation superimposed on a predetermined direct current offset.

3. The method of claim 1 further including reactive amplification means wherein the reactive elements are used to substantially amplify said energy's influence on said electrokinetic behavior of said charged particles.

4. The method of claim 1 further including natural damping means wherein said electromotive force's peak amplitude is substantially damped by said physical process' impedance.

5. The method of claim 1 wherein said electromotive force is adapted as a waveshape substantially described by the mathematical formula:

$$f(x) = (-|(\sin(x-c))| + \text{direct current offset}) \text{ peak electromotive force};$$

wherein said x variable is a linear function of time and said c parameter is a predetermined constant that sets the initial condition at time equal to zero.

6. The method of claim 1 wherein said electromotive force is adapted as a waveshape substantially described by the mathematical formula:

$$f(x) = (|(\sin(x-c))| + \text{direct current offset}) \text{ peak electromotive force};$$

wherein said x variable is a linear function of time and said c parameter is a predetermined constant that sets the initial condition at time equal to zero.

7. The method of claim 1 wherein said electromotive force is adapted as a waveshape substantially described as a trapezoidal step function with a predetermined rate of change that is substantially based on said charged particles' resonance and transient response time and a rest period of zero to greater than five time constants.

8. The method of claim 1 wherein said control means further includes adjustment of said waveform generator to sufficiently change said waveform to substantially optimize said electromotive force based on changing condition of said physical process;

and said changing condition includes at least one parameter from the group of voltage, current, impedance, temperature, pressure, and ion activity.

9. The method of claim 1 wherein said control means further includes adjustment of said power source to sufficiently change said energy to substantially optimize said electromotive force based on changing condition of said physical process;

and said changing condition includes at least one parameter from the group of voltage, current, impedance, temperature, pressure, and ion activity.

10. The method of claim 1 wherein said physical process is an electrochemical process.

11. The method of claim 1 wherein said physical process is a photochemical process.

12. The method of claim 1 wherein said physical process is a biological process.

13. The method of claim 1 wherein said natural electrical response is substantially a natural resonance point of said physical process.

14. The method of claim 1 wherein said natural physical characteristic of said physical process is an electrical double layer.

15. The method of claim 1 wherein said natural physical characteristic of said physical process is an energy gap.

16. The method of claim 1 further including perturbation means wherein said electromotive force effectively causes a mass transport perturbation of said charged particles.

17. An apparatus for improved control of electrokinetic behavior of charged particles in a physical process, that comprises:

waveform generating means to produce a waveform of predetermined amplitude, frequency, waveshape, damping factor, and duty cycle;

power source means for producing sufficient energy;

injection means to:
   combine said waveform with said energy to produce an electromotive force;
   apply said electromotive force to said process;

control means to repeat above steps until a preselected parameter is achieved;

whereby said electrokinetic behavior of said charged particles is substantially matched to said process' natural electrical response and physical characteristics.

18. The apparatus of claim 17 wherein said injection means is implemented with a coupled inductor.

19. The apparatus of claim 17 wherein said waveform generator means is implemented with an inductor capacitor tank oscillator circuit.

20. The apparatus of claim 17 wherein said control means further includes adjustment of said waveform generator to sufficiently change said waveform to substantially optimize said electromotive force based on changing condition of said physical process;
   and said changing condition includes at least one parameter from the group of voltage, current, impedance, temperature, pressure, and ion activity.

21. The apparatus of claim 17 wherein said control means further includes adjustment of said power source to sufficiently change said energy to substantially optimize said electromotive force based on changing condition of said physical process;
   and said changing condition includes at least one parameter from the group of voltage, current, impedance, temperature, pressure, and ion activity.

22. The apparatus of claim 17 wherein said control means is selected from the group consisting of microprocessor, microcontroller, and application specific integrated circuits.

23. An integral battery module apparatus that comprises:
   a battery with at least one cell;
   switching means to control current flowing into said module from external power source and out of said module from said battery to external load;
   waveform generating means to produce a waveform of predetermined amplitude, frequency, waveshape, damping factor, and duty cycle;
   injection means to:
      combine said waveform with said current to produce an electromotive force;
      apply said electromotive force to said battery;
   control means to:
      monitor said battery;
      adjust said waveform generator to sufficiently change said waveform to substantially optimize said electromotive force based on changing condition of said battery;
         and said changing condition includes at least one parameter from the group of voltage, current, impedance, temperature, pressure, and ion activity;
      select said switching means to control galvanic, electrolytic, and storage modes of said battery;
      repeat above steps until a preselected parameter is achieved;
   whereby said module is packaged as a single functional unit that is substantially said battery's functionality and size; and further the electrokinetic behavior is optimized in the galvanic, electrolytic, and storage modes.

24. The apparatus of claim 23 wherein said module further includes regulating means to regulate energy provided to said external load.

25. The apparatus of claim 23 wherein said module further includes programmable regulating means to regulate energy provided to said external load based on a signal from said external load.

26. The apparatus of claim 23 wherein said module further includes regulating means to regulate energy provided from said external power source.

* * * * *